(12) United States Patent
Agoston

(10) Patent No.: US 12,102,912 B2
(45) Date of Patent: Oct. 1, 2024

(54) MACHINE LEARNING DRIVEN RESOURCE ALLOCATION

(71) Applicant: Sony Interactive Entertainment LLC, San Mateo, CA (US)

(72) Inventor: Steve Agoston, San Mateo, CA (US)

(73) Assignee: Sony Interactive Entertainment LLC, San Mateo, CA (US)

(*) Notice: Subject to any disclaimer, the term of this patent is extended or adjusted under 35 U.S.C. 154(b) by 336 days.

(21) Appl. No.: 17/393,344

(22) Filed: Aug. 3, 2021

(65) Prior Publication Data

US 2021/0362049 A1   Nov. 25, 2021

Related U.S. Application Data

(63) Continuation of application No. 16/208,461, filed on Dec. 3, 2018, now Pat. No. 11,077,362.

(51) Int. Cl.
*A63F 13/355*   (2014.01)
*A63F 13/335*   (2014.01)

(52) U.S. Cl.
CPC .......... *A63F 13/355* (2014.09); *A63F 13/335* (2014.09); *A63F 2300/407* (2013.01); *A63F 2300/531* (2013.01); *A63F 2300/538* (2013.01)

(58) Field of Classification Search
CPC .......... A63F 13/355; G06F 2209/5019; G06F 9/5083; G06F 9/5072
See application file for complete search history.

(56) References Cited

U.S. PATENT DOCUMENTS

| 9,628,332 | B2 | 4/2017 | Bruno, Jr. et al. |
| 10,296,391 | B2* | 5/2019 | Justice ............... H04L 67/1004 |
| 10,841,236 | B1* | 11/2020 | Jin ....................... H04L 67/1014 |
| 11,003,499 | B1* | 5/2021 | Abretske ............... A63F 13/358 |
| 11,471,764 | B2* | 10/2022 | Kolen .................... A63F 13/355 |
| 2012/0102185 | A1 | 4/2012 | Fernandes |
| 2013/0254417 | A1 | 9/2013 | Nicholls |
| 2015/0375113 | A1* | 12/2015 | Justice .................. G06F 9/5027 463/42 |

(Continued)

FOREIGN PATENT DOCUMENTS

| CN | 104363277 A | 2/2015 |
| CN | 104598292 A | 5/2015 |

*Primary Examiner* — Seng H Lim
(74) *Attorney, Agent, or Firm* — PENILLA IP, APC

(57) ABSTRACT

A distributed game engine for provisioning resources for an online game includes a plurality of management nodes and a plurality of processing nodes. The management nodes are configured to distribute functional portions of the distributed game engine over the plurality of processing nodes. A resource allocation mode is constructed from user inputs game states of the online game and success criteria included in game play training data. A resource allocation agent is used to access the resource allocation model and to communicate with a configuration agent to identify the processing nodes required for processing specific ones of the functional portions for the online game, based on the resource allocation dictated by the resource allocation model. A process synchronization layer interfaces with the processing nodes and the management nodes to provision the resources for executing the functional portions for the online game in order to produce video frames for rendering at client devices of the users.

9 Claims, 12 Drawing Sheets

(physical view)

(56) References Cited

U.S. PATENT DOCUMENTS

| | | |
|---|---|---|
| 2016/0019094 A1 | 1/2016 | Habdank et al. |
| 2016/0323161 A1 | 11/2016 | Cuervo Laffaye et al. |
| 2017/0024259 A1* | 1/2017 | Mecklin ................. H04L 69/24 |
| 2018/0024868 A1 | 1/2018 | Mehta et al. |
| 2019/0213099 A1* | 7/2019 | Schmidt ................. G06N 3/044 |
| 2020/0306632 A1* | 10/2020 | Kolen ..................... A63F 13/79 |
| 2023/0211233 A1* | 7/2023 | Kolen ..................... A63F 13/79 |
| | | 463/23 |

* cited by examiner (physical view)

(logical structure)

MACHINE LEARNING DRIVEN RESOURCE ALLOCATION

CLAIM OF PRIORITY

This application is a Continuation of U.S. application Ser. No. 16/208,461, filed on Dec. 3, 2018, entitled "Machine Learning Driven Resource Allocation," which is incorporated herein by reference in its entirety for all purposes.

TECHNICAL FIELD

The present disclosure is related to allocating resources for an online game, and more specifically to building an artificial intelligence (AI) model and using the AI model to identify and allocate resources for the online game.

BACKGROUND OF THE DISCLOSURE

Online game has become very popular within the gaming world. Online game, especially, massive multi-player online (MMO) games a vast number of users participate in the game simultaneously via a network of computers. As a result, the MMO games require a lot of coordination of resources for executing game logic of the online game, in order to provide a satisfactory game play experience to users. In some instances, the online game is played using a network of game consoles, with each game console dedicated to a particular user. During a game play session, the number of game consoles is spun-up or spun down depending on the demand of the online game. Each game console provides the available resources for the online game for the corresponding user. The resources of the individual game console are controlled independently and are not shared amongst the users.

In alternate instances, the online game is executed on a game cloud using the resources of the game cloud system and the users are able to connect to the online game executing on a cloud server. The advantage of executing the online games on the game cloud is that the resources required for the execution of the game are centralized. However, as the number of players playing the online game simultaneously increases, the game cloud system resources are increasingly strained making it difficult to provide an acceptable quality of service to the users of the online game. The strain on the resources may be due to amount of data generated for the online game. For example, in a MMO game, each player has to be provided with game data that is based on their own perception. In order to avoid the strain, the game developers set a limit on the number of users that can simultaneously play in a game play session. Even with a set limit, the strain on the resources may cause latency, severely affecting the game play experience for a user, especially in a fast-paced games that require quick dissemination of game data to the user so that the user can strategize their next move. Further, allocating resources to the online game executing on the cloud server based on the distribution of the users is extremely complex.

It is in this context that embodiments of the disclosure arise.

SUMMARY

Embodiments of the present disclosure relate to systems and methods for provisioning resources for an online game. The online game is executed using a distributed game engine that includes a plurality of management nodes and processing nodes. The management nodes are used to identify and distribute functional portions of the distributed game engine to a plurality of processing nodes for processing. The functional portions relate to game engine tasks of the distributed game engine that process specific features for the online game. The functional portions are distributed to the processing nodes using a resource allocation model. The resource allocation model is built using machine learning algorithm and is trained with game play training data that includes inputs received from users (i.e., players, developers), game states of the online game obtained from historical game play, and success criteria. The resource allocation model identifies the functional portions of the game engine required for the online game, the resources required for processing the functional portions, and specific ones of the processing nodes within a cloud gaming system that can provide the necessary resources for processing the identified functional portions. An allocation agent is used to communicate with a configuration agent to allocate the identified functional portions to the specific ones of the processing nodes for processing.

The machine learning algorithm uses initial inputs from a developer of the online game to generate the allocation model. The generated allocation model is then trained using inputs from users (players, spectators, etc.), game states of the online game for prior and current game plays, collected from a network of servers. The machine learning algorithm analyzes the game states against success criteria defined for the online game to identify optimal amount of appropriate processing nodes having resources to process the functional portions of the game engine for the online game. The generated resource allocation model includes a plurality of inter-connected processing nodes, with one or more processing nodes assigned to process a specific functional portion of the game engine. Each processing node is represented by a server. The server could be a stand-alone physical server or a physical server that is part of a data center, a virtual server that is part of virtual cloud system or a container server or any combinations thereof. The physical server within the data center could be a single server or could be part of a rack of servers within the data center that is accessed through a rack router, such as top of rack router.

The distributed game engine is configured to manage assignment of specific ones of the game engine tasks (i.e., functional portions) for the online game to corresponding ones of the processing nodes identified from the resource allocation model, distribute the specific game engine tasks to the appropriate processing nodes for processing, route the processed results between the processing nodes and between the processing nodes and a configuration agent, and synchronize processing of the game engine tasks distributed amongst the processing nodes by managing queues of the game engine tasks while taking into consideration process timing for processing the game engine tasks.

The functional portions processed using the resources of the processing nodes may include certain core areas of the online game, such as game physics, graphics, audio, logic, artificial intelligence (AI), scripting, animation, networking, streaming, optimization, memory management, threading, localization support, to name a few. The aforementioned functional portions are provided as mere examples and should not be considered exhaustive. The resource allocation model of the distributed game engine, provides a framework wherein a multitude of reusable components (i.e., processing nodes) are identified for processing the core features of the online game that are used to bring the online game to life. The resource allocation model is continually updated in accordance to the user inputs (i.e., part of the training data) collected over time from online game execution. The collected user inputs are analyzed in accordance to the success criteria prior to updating the allocation model. The updates to the allocation model may include adjustments to the number and type of resources that may be required for processing the functional portions (i.e., game engine tasks) of the game engine. The collecting of inputs and updating of the resource allocation model is ongoing so long as the online video game is being accessed by the users.

In one embodiment, a distributed game engine for provisioning resources for an online game, is disclosed. The distributed game engine includes a plurality of management nodes that are configured to distribute functional portions of the distributed game engine over a plurality of processing nodes. The distributed game engine also includes a resource allocation model that is constructed from game play training data. The training data includes inputs received from users, game states of the online game, and success criteria. The distributed game engine further includes a resource allocation agent for accessing the resource allocation model and communicating with a configuration agent to identify the plurality of processing nodes required for processing specific ones of the functional portions for the online game, wherein a type and number of the processing nodes required for processing each one of the functional portions are based on resource allocation dictated by the resource allocation model. The distributed game engine includes a process synchronization layer that interfaces with each of the plurality of processing nodes and each of the plurality of management nodes to provide resources of the processing nodes for executing the online game that produces video frames for rendering at client devices of the users.

In another embodiment, a method for provisioning resources for an online game is disclosed. The method includes receiving training data for the online game. The training data identifies user inputs, game states and success criteria for the online game. The method also includes generating a resource allocation model for the online game from the training data. The generated resource allocation model identifies a plurality of processing nodes that are configured for processing functional portions of a distributed game engine used for the online game. Select ones of the plurality of processing nodes are configured to provide processing resources to process a specific functional portion of the distributed game engine. The plurality of processing nodes is allocated to process the functional portions for the online game, in accordance to resource allocation dictated by the resource allocation model, wherein each functional portion identifies a specific game engine task. The allocation includes managing assignment of select processing nodes to process select ones of game engine tasks associated with the specific functional portion, for the online game, distributing the select ones of the game engine tasks to the select processing nodes for processing, routing processed results between the select processing nodes and remaining ones of the plurality of processing nodes and between the select processing nodes and a configuration agent used for provisioning resources for the processing nodes, and synchronizing processing of the game engine tasks distributed amongst the plurality of processing nodes.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings.

FIG. 3A illustrates components of training data used in generating and training a resource allocation model used in provisioning resources for an online game, in accordance with one implementation of the present disclosure.

DETAILED DESCRIPTION

Figure 1:
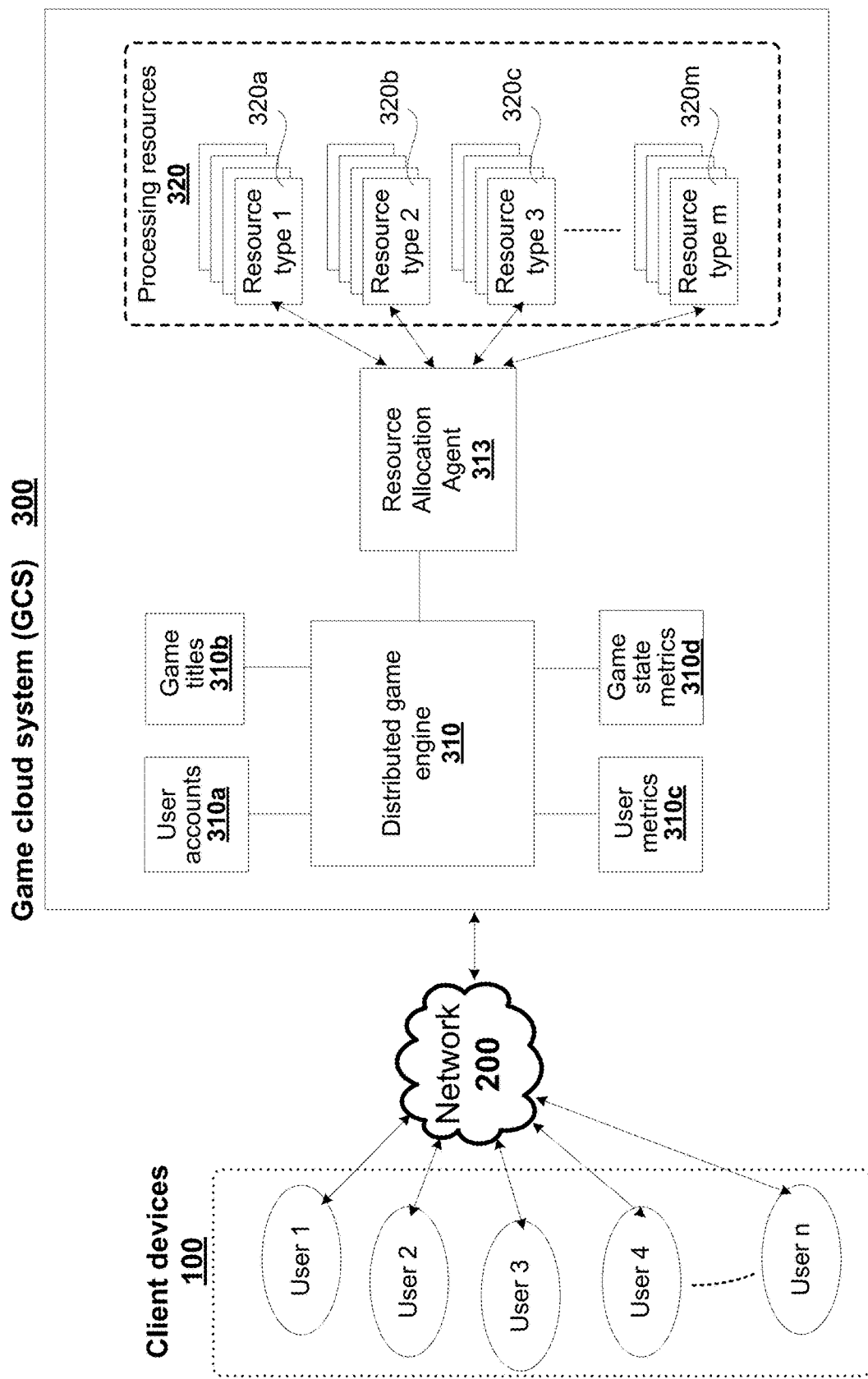
FIG. 1 illustrates a simplified physical view of a game cloud system that is used in provisioning resources, in accordance with one implementation of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods that implement machine learning algorithm to build a resource allocation model (i.e., an AI model) for a game application using training data that is provided by the online game. The training data includes inputs provided by users for the online game, game states that are influenced by the users' inputs, and success criteria defined for the online game. The users' inputs are collected via a network of back-end servers (e.g., game consoles, gaming servers, etc.) without the knowledge of the players and used in building and training the AI model using machine learning that utilizes artificial intelligence (AI) based algorithms. The trained AI model is used to learn the intricacies of the online game, including how the game data is processed. For example, an output from the trained AI model for given game data is analyzed to identify the resources that were required to meet the success criteria defined for the online game.

In some implementations, the success criteria may be defined as provisioning sufficient resources for processing the game related data so as to provide an optimal game experience for the users. The success criteria may be based on user inputs, type of user (player, spectator, etc.) and a type of game that is being played. For example, the success criteria may be defined to include minimal latency, or high quality of images or audio, or efficient memory management, or greater communication bandwidth, etc. In such implementations, the machine learning algorithm analyzes the training data to find an output that correlates with a given set of inputs to identify the resources allocated for processing the game related data that resulted in the output meeting a success criteria defined for the online game. The algorithm thus maps the output pattern to the user inputs for the defined success criteria to generate and/or train the AI model. Using the mapping of the trained AI model, predicted demand on resources may be determined for a set of inputs encountered during subsequent game play of the online game. The AI model may be trained to provide mapping of different outputs to users' inputs that satisfy different success criteria and the algorithm is able to use the different mappings to predict the resource demands for the online game that relates to the defined success criteria.

For example, for a high intensity game, the success criteria may be defined to be faster processing and higher transmission rate for game data so that the user playing the online game will be able to receive the game data in a timely manner in order to strategize their next move. Any lag in the transmission of the game data could severely affect the user's game play. In this example, the algorithm will use the trained AI model to identify the type of resources required to achieve the required speed of processing and transmission of frames to the client device (i.e., specified success criteria). As a result, using the mappings within the trained AI model, the algorithm may be able to identify that one or more of the previous game play(s) used certain ones of the processing resources with faster CPUs that processed the game data, encoded the game data and assembled the game data into frames in a fast and efficient manner. Additional resources may be identified that provided higher bandwidth for transmitting the frames to the client devices. Based on this information, the algorithm may identify the processing resources and provision these processing resources in anticipation that the game play may require these resources to provide the game data to the client device with very minimal lag. The resources that may be identified by the algorithm for provisioning to the online game may be the same resources that were previously assigned to the online game or resources that have similar or better capabilities.

The machine learning algorithm uses classifier engines to identify various functional portions of a game engine used for processing different features of the online game, learn rules defining relationship between the features and output, and build an AI model with a plurality of nodes disposed in different layers and interconnected in a hierarchical fashion, with one or more nodes identifying a feature. The nodes also identify the resources that were used to process the feature. Each feature in a node of the AI model may be linked with one or more features of other nodes in other layers, with the relationship parameter defined by a rule. The generated AI model is further trained by refining the features in each node based on the inputs received from the users during game play. The trained AI model maps the inputs to different outputs based on the rules defined by the success criteria. When subsequent game play is initiated by the users, the trained AI model can be used to identify resources required to provide the desired outcome, based on the current game state(s) and the success criteria defined for the online game. The AI model is trained to identify a variety of outcomes for satisfying different success criteria. The AI model thus can be used to predict the demand for certain types of resources in order to satisfy specific success criteria so that the appropriate type and amount of resources can be quickly provisioned during subsequent execution of the online game, in order to meet the success criteria.

After initial allocation of the processing resources based on the AI model, the user inputs are continually collected from game play on an ongoing basis and used in training the AI model. Information provided in the nodes of the trained AI model is used in adjusting the resources allocated to the online game. For example, as each of the plurality of users of the online game progress at their own pace, the predicted demand for the resources may change. This may be due to the changes in the game data generated by the respective user's inputs and the resulting game state of the online game. As a result, the refined AI model is used to identify and predictively provision the necessary resources for the online game.

With the above general understanding of the various embodiments, example details of the embodiments will now be described with reference to the various drawings.

FIG. 1 is a simplified physical view of a system used for provisioning resources for an online game using a resource allocation model that is trained using machine learning algorithm. The system includes a plurality of client devices 100 associated with users 1-*n*, accessing a game cloud system (GCS) 300 over a network 200, such as the Internet. The game cloud system includes a network of back-end servers executing instances of one or more online game applications, in accordance with one implementation of the present disclosure. The back-end server is a game server that is configured to execute one or more instances of one or more games. The game server may be any type of server computing device available in the game cloud system. For instance, game server may manage a virtual machine supporting a game processor that executes an instance of an online game for a user, on a host. The client devices could be any computing device, such as mobile phone, tablet computer, personal computer, etc., that includes a memory, processor and a network interface to interact with the back-end servers by accessing the network 200, or could be a thin client that provides the interfaces to interact with the back-end server, which provides the computation functions.

In some implementations, the online game may be executed remotely by the plurality of servers of the game cloud system and the game data streamed to the client devices of the players over the network 200, wherein the player is a user that is engaged in game play of the game. The game play of the online game is controlled by the players using control options provided in the client devices or using controllers that are communicatively connected to the client devices. In other implementations, the online game may be executed locally at the client devices and metadata from the executing online game is transmitted over the network 200 to the back-end servers for affecting the game state and for using as training data for the purposes of generating and training the AI model.

The training data used for training the AI model include game state of the online game at a particular point of game play. The game state provides the intricacies of the game play of the online game. Thus, the game state, for example, may include game characters, game objects, game object attributes, game attributes, game object state, graphic overlays, etc. The game state also includes state of every device or module or component of the network of servers used in the execution of instances of the online game, such as CPU, GPU, memory, register values, program counter value, programmable DMA state, buffered data for the DMA, audio chip state, CD-ROM state, available communication bandwidth, etc., used for generating and rendering game play data. The game state also identifies parts of the executable code that is currently rendering and parts of the executable code that needs to be loaded for continuing game play. The user saved data for a player included in the game state may include user profile of the player, user customizations to game objects, game type, game level/difficulty selected by the player, amount of game tools/winnings/points/cash/awards, etc. The game state may also include randomly generated features or AI overlays or game intricacies that are useful in understanding the game details associated with game play of the online game.

The online game executed on the game cloud system may be a massive multiplayer online (MMO) game and the game server may include a multi-player distributed game engine 310 that communicates with game logic of the online game to allow interaction of the players (i.e., users) with the game logic and interaction between players within the corresponding game environment of each player. The game logic is configured to manage game states for each of the players during a MMO game session. The game states include game state of the game play for each player at a particular point, and saved data of each player including any game customization provided by the player, for the online game. The multi-player distributed game engine 310, using the game states, is able to overlay/insert objects and characters into each of the gaming environments of the players participating in the MMO game session.

The distributed game engine 310 interacts with a plurality of modules, such as user account module 310a, game titles module 310b, user metrics module 310c and game state metrics 310d, to name a few. The user account module 310a is used to authenticate a user accessing the GCS 300 for game play of an online game. The game titles module 310b is used to determine the game titles available at the GCS 300 to the user associated with the user account, for game play, including games that are free, games that have been purchased by a user, etc. The distributed game engine 310 executes instances of a game on a plurality of servers within the GCS 300 in response to a user's selection of the game for game play. As the user plays the online game, user inputs are gathered and used to update user and game metrics. The user inputs are processed by the game logic to affect a game state of the game and generate game play data for transmitting to the client device of the user. The game state of the online game is analyzed to identify user metrics of the user and game state metrics of the online game. The user metrics module 310c is updated with the user metrics of the user. Some of the user metrics that are updated to the user metrics module 310c include game identifier, time the user accessed the online game, amount of time the user spent playing the game, game level played, amount of time spent at each game level, number of challenges overcome within each game level, number of attempts to overcome each challenge, game scores/wins, skill level of the user, etc. Similarly, the game state metrics module 310d extracts the game state metrics of the online game from the game play data of the online game.

The distributed game engine 310 interacts with a resource allocation agent 315 to identify resources 320a-320m required to provide optimal game play of the game. The resource allocation agent 315 refers to a resource allocation model generated using machine learning algorithm to predict the types of resources and an amount of each type of resources required for execution of the online game. The prediction is based on state of the online game, the user inputs and the success criteria defined for the online game. Based on the predicted demand for the different types of resources as directed by the success criteria, the resource allocation agent signals a configuration agent to provision the resources 320-320m for the online game so the online game can run efficiently.

Figure 2:
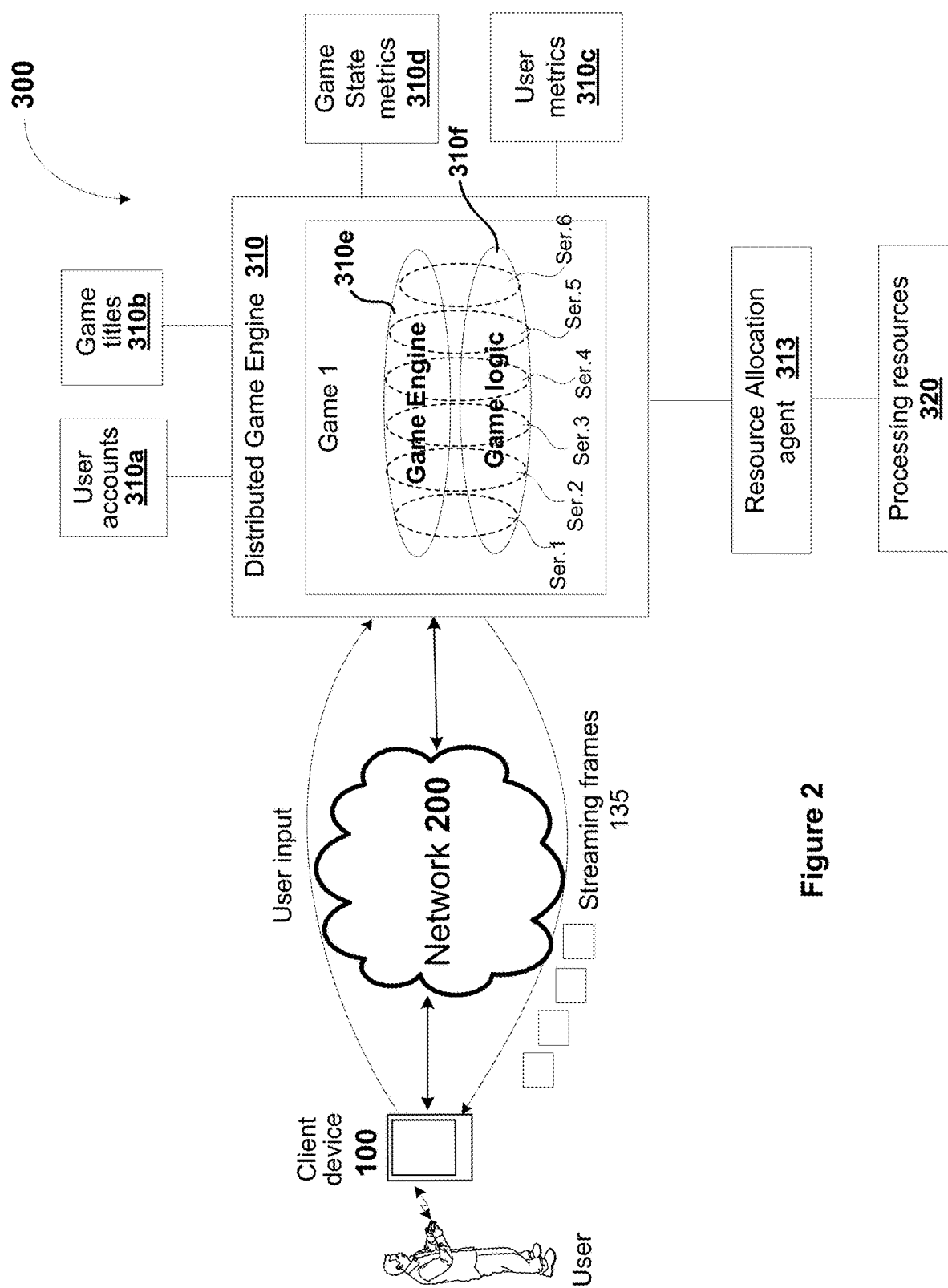
FIG. 2 illustrates a simplified block diagram of a distributed game engine employed within the game cloud system for provisioning resources for an online game, in accordance with one implementation of the present disclosure.

FIG. 2 illustrates an implementation of the distributed game engine that uses the physical resources for processing the functional portions of the distributed game engine related to features of game data generated for the online game, in response to the users' inputs received during game play. The online game may be a massive multiplayer online (MMO) game that is accessed by a plurality of users. The plurality of users may be part of a team, or social contacts, or may be independent users who are accessing the online game from across a geographical area spanning a city, or across multiple cities, or across countries or across the globe. In order to allow the users to efficiently access the online game, the online game is executed using a distributed game engine that uses a network of servers/system resources distributed across the geographical area to execute instances of game engine and game logic of the online game.

Generally speaking, a game engine is a software layer that serves as a foundation for a game, such as MMO game, and provides a framework that is used to develop the online game. The game engine abstracts the details of doing common related tasks (i.e., game engine tasks) required for every game, while the online game developers provide the game logic that provides the details of how the online game is to be played. The game engine framework includes a plurality of reusable components for processing several functional portions (i.e., core features) for the online game that bring the online game to life. The basic core features that are processed by the game engine may include physics (e.g., collision detection, collision response, trajectory, movement of object based on gravity, friction, etc.), graphics, audio, artificial intelligence, scripting, animation, networking, streaming, optimization, memory management, threading, localization support, and much more. The reusable components include process engines that are used to process the core features identified for the online game. During game runtime, the game engine manages the game logic of the online game, manages the allocation and synchronization of the functional portions of the game engine to process game data, in an optimal manner, and generates frames of game data that is transmitted back to the client devices for rendering. A variety of game engines that are currently available provide different core functionalities and an appropriate game engine may be selected based on the functionalities that are available for executing the online game.

In the implementation illustrated in FIG. 2, instances of the game engine and game logic are distributed across a plurality of servers with each server execute a certain functional portion of the game engine. The different servers may process the game data in parallel by executing the different instances simultaneously. In this manner, the distributed game engine allows for faster and efficient processing of the game data. The game engine may be configured to process a plurality of functional portions that are needed for bringing an online game to life. In some implementations, each online game developed for an MMO game environment may identify different functional portions of the game engine that are required for the online game to function. In other implementations, every one of the online games developed for the MMO game environment may require same type of functional portions for bringing the respective ones of the online games to life. In implementations where every online game identifies same type of functional portions, certain ones of the online games may emphasize on select ones of the functional portions more than others and the emphasis may be based on type of users accessing the online game, type of game, game state of the online game, and the success criteria defined for the online game. For example, the users may be of player type or spectator type. Thus, when the online game is accessed by players, the emphasis may be on the functional portions that can provide game data in a fast and efficient manner (i.e., functional portions related to physics, assembling/encoding, and bandwidth in order to provide the game data to the client devices with minimal latency). When the online game is accessed by spectators, the emphasis may be based on the functional portions that can provide access to a specific player's game play that the spectators choose to follow or to the online game in general (e.g., functional portions related to physics, audio, scripting, and scene graphs in order to provide a high quality game data). Alternately, the online game may be of a high intensity type or a low intensity type. Thus, when the online game is of the high intensity type, the emphasis may be on the physics, faster processing, assembling and transmission, while for the low intensity game, the emphasis may be on physics, texturing, shading, animation, scene graph, scripting and/or sound. Similarly, a player may be a high level player or novice or a medium level player. Thus, when the player is a high level player, the emphasis may be on faster processing, assembling/encoding and bandwidth, while for a medium or novice level player the emphasis may be on different functional portions. In other implementations, different MMO games may emphasize on different types of the functional portions.

The functional portions may be identified by the developer of the online game or may be determined by analyzing game logic of the online game. Based on the online game's specification requirements, instances of the game engine and game logic may be executed on a plurality of servers (i.e., processing nodes), with each game engine instance executing on a server engaging a specific process engine to process a functional portion that relates to a specific feature of the game data generated from game play of the online game, based on the success criteria defined. In the simplified example implementation illustrated in FIG. 2, instances of the game engine, game logic of online game, Game 1, is instantiated on 6 servers (Servers 1-6), with each server being used to process a specific functional portion of the game engine related to a particular feature of the game data for the online game, Game 1. For instance, server 1 (i.e., processing node 1) may be used to engage physics engine to process game physics feature of the game data for the online game, server 2 (i.e., processing node 1) may be used to process texturing, server 3 (i.e., processing node 1) for shading and so forth. The instances of the game engine provide iterative processing of the game data by having the output from a first server (i.e., a result from the processing of a functional portion) acting as an input to a second server, the output from the second server acting as an input to a third server (or to a first server), and so on. In the implementation illustrated in FIG. 2, a single server (i.e., processing node) is assigned for executing an instance of the game engine and game logic used to process a specific functional portion of the game engine. In other implementations, a plurality of servers, each executing an instance of the game engine and game logic, may be assigned to process a specific functional portion, based on the predicted demand for such processing as directed by the user inputs and the success criteria. Since the game engine and game logic are instantiated on a plurality of servers for processing different functional portions of the game engine required for bringing the online game to life, the game engine is said to be "distributed". Thus, any reference to distributed game engine used in this application refers to this configuration where the game engine and corresponding portion of the game logic is instantiated on multiple servers.

The game data that is output from the different servers are synchronized, assembled, encoded and transmitted to the respective ones of the client devices for rendering. The game engine also includes a synchronization engine (not shown) that is used to synchronize the distribution of the various functional portions of the game engine to different servers, synchronize the processing of the different functional portions of the game engine assigned to different servers, and route the processed results between the servers and between the servers and a configuration agent. The configuration agent (not shown) of the distributed game engine is used to keep track of servers that are being used to process a particular type of functional portion of the game engine, and type and number of servers that are assigned to process the particular type of functional portions. The configuration agent may interact with a resource allocation agent 315 of the distributed game engine to provision additional servers (i.e., processing resources 320) for processing particular type(s) of functional portion of the game engine, based on the success criteria defined for the online game.

The allocation of the processing resources may be done ahead of the users accessing the online game for game play and such allocation is based on predicted demand on the resources determined from a AI model developed using a machine learning algorithm. When the users access the online game for game play, the users' inputs received from the client devices are monitored and used to affect a game state of the online game. The users' inputs and the game state of the online game are used by the distributed game engine to generate an AI model and use information from the AI model to determine if additional processing resources need to be provisioned so as to provide optimal game play experience of the online game.

Figure 3:
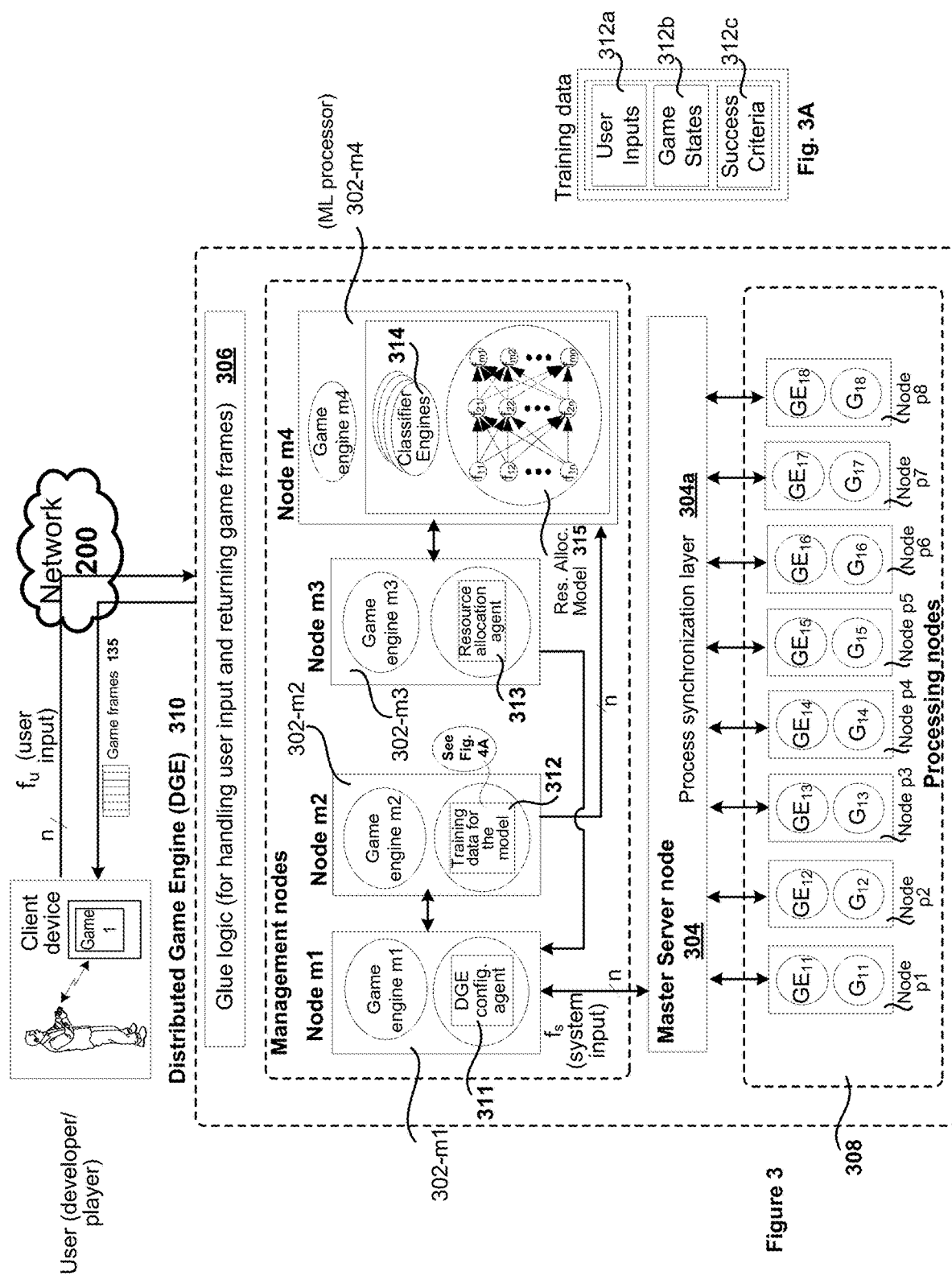
FIG. 3 illustrates the various components of a distributed game engine used in provisioning resources for an online game, in accordance with one implementation of the present disclosure.

FIG. 3 illustrates an example implementation identifying various components of a distributed game engine that is used for provisioning resources for an online game. The online game may be a massive, multiplayer online game that may be instantiated on multiple servers of a game cloud system 300 so that users can access the online game from different geo locations. The distributed game engine 310 is part of the game cloud system 300 and includes functional portions required for bringing the online game to life, wherein the functional portions can be executed on separate servers. The distributed game engine 310 communicates with client devices 100 of a plurality of users over a network 200 using network interfaces, during game play of an online game (e.g., game 1) and receives users' inputs for the online game. In response to the users' inputs, video frames of game data are generated, encoded and returned to the client devices 100 for rendering. The distributed game engine 310 includes a glue logic 306 that receives the inputs of different users from different client devices, and in response identifies frames of game data that are to be targeted for each client device, bundles the game data together and forwards the frames of game data to the client devices of the users.

The game engine is executed on one or more back-end servers of a game cloud system 300. The back-end servers provide a machine learning engine, for example, to analyze the game data generated in response to the inputs received from the users and train a resource allocation model (AI model) 315 for an online game that is selected for game play by the users. The AI model is initially generated from game data resulting from processing inputs provided by developers of the online game. The inputs provided by the developers may be from simulated game plays performed by the developer or inputs obtained from a controlled group of users playing the online game. The generated AI model is then trained on an ongoing basis using inputs from game plays of different users. The users' inputs are used to drive a game state of the online game. The AI model is generated using layers of interconnected nodes, wherein each node relates to a different feature of game data. The nodes of the AI model are populated with features and the inter-relationships are established to understand the intricacies of game play of the online game. The game data input to the AI model identifies various resource configuration outputs, based on different success criteria defined for the online game, wherein the outputs for different success criteria are identified by following different inter-relationship paths of the AI model. For example, when a particular success criterion, game inputs, and game state are provided as input, the AI model can be used to identify the particular resource configuration that is needed to achieve the particular success criterion for the game state of the online game.

The distributed game engine illustrated in FIG. 3 includes a plurality of management nodes 302 and a plurality of processing nodes 308 that are used to process the game data generated for the online game. Information from the processed game data are used to build and train the AI model and to use the AI model to predict a particular resource configuration required for the online game. Each of the plurality of management nodes 302 and processing nodes 308 executes an instance of the game engine and game logic of the online game. Each processing node or management node can be considered to be a distinct server that is configured to execute an instance of the game engine and game logic of the online game. The management nodes 302 refer to the AI model 315 to identify the game engine tasks that need to be executed on different processing nodes, manage assignment of the game engine tasks to appropriate processing nodes that provide the resources required to process the assigned game engine tasks, distribute the game engine tasks to the processing nodes (i.e., servers) for processing, build an AI model using information from the processed game engine tasks, manage allocation of resources for the various processing nodes based on the AI model, and route the processed results from one processing node to another. At least one processing node is configured to assemble the results of the various game engine tasks output by the various processing nodes, encode the results from the processing nodes to generate video frames of streaming game data 135 for onward transmission to the respective client devices for rendering. The at least one processing node is further configured to format the video frames so that the video frames are of compatible format for the different client devices of users. In some implementations, the video frames are formatted based on a test conducted by the processing node to determine available bandwidth and protocol used for transmitting the video frames. The video frames of streaming game data 135 are processed by the glue logic 306 to identify the video frames targeted for each of the client devices so as to route the video frames accordingly. Additional nodes (e.g., master server node 304) may be provided in the distributed game engine 310 to coordinate synchronization of the game engine tasks assigned to different processing nodes (i.e., servers) and/or manage the queues of game engine tasks. As new users join the game cloud system, the distributed game engine is also configured to route the new users to an instance of the online game executing at a processing node of the game cloud system.

In one implementation, each of the plurality of management nodes 302 is used to perform a specific management task. For example, a first management node (node m1) 302-m1, equipped with a configuration agent 311 is configured to receive system inputs from the processing node servers executing the online game, analyze the system inputs to identify a current resource configuration, and to manage the resource configuration for the online game. The system inputs provide system configuration information as well as game states of the online game resulting from the processing of the game inputs received from the game play of the users. A second management node (node m2) 302-m2 equipped with a data collection engine is configured to receive the user inputs from a plurality of users (i.e., players) playing the online game and the system inputs from the configuration agent 311, process the inputs to generate game data, and generate training data for training a resource allocation model (AI model) from the processed game data. A third management node (node m3) 302-m3 equipped with a resource allocation agent 313 is configured to optimize resource allocation for the online game. Specifically, the resource allocation agent 313 may determine if optimal amount of resources have been provided for the online game and when, where certain resources need to be spun-up or spun-down. The resource allocation agent is used to determine type and amount of resources for the online game currently provided and type and amount of resources required for achieving success criteria, and follow an "elastic compute" concept to signal the configuration agent to scale up or scale down certain ones of the resources to meet the changing demands for the online game. The resource allocation agent provides the flexibility to adapt to workload changes by controlling the provisioning and de-provisioning of resources based on game states and success criteria at any point of time during game play, such that the system has sufficient resources available to match as close to the current demand of the system resources as possible. A fourth management node (node m4) 302-*m*4 with one or more classifier engines 314 is configured to generate and train a resource allocation model 315 for the online game in accordance to the success criteria defined for the online game, using the training data that includes users inputs and the system inputs. The resource allocation model 315 is used by the resource allocation agent to signal the configuration agent to adjust the resources allocated for the online game.

FIG. 3A illustrates the various components of an example training data used in training the resource allocation model 315. As shown, the training data includes user inputs 312*a* from the plurality of users received during game play, game states 312*b* of the online game for each of the plurality of users that is influenced by the user inputs, and success criteria 312*c*. Of course, the aforementioned components of training data is provided as a mere example and that other types of inputs may also be considered for training the resource allocation model 315. The users providing the inputs can be players, spectators, and/or developers and the resource allocation model 315 is designed to identify the appropriate resources for each type of user.

The resource allocation model 315 uses machine learning algorithm to train the model 315. The machine learning algorithm may be provided on machine learning server (i.e., ML processor) 302-*m*4 that may be specifically configured to include one or more classifier engines to generate and train the resource allocation model 315. The trained model 315 provides a mapping of the outputs that meet the success criteria defined for the online game to the user inputs, wherein the user inputs were processed to influence the game state of the online game. The machine learning algorithm analyzes the game data generated by the game logic, in response to the users' inputs, to identify the various functional portions of the game engine used to process specific features of the game data and the system resources used to process the specific features to achieve different success criteria for the online game. The features of the game data may include physics, texturing, shading, assembling/encoding, audio processing, scripting, animation, memory management, scene graphics, etc., and the functional portions of the game engine may identify the specific components (i.e., engines or modules) to engage for processing the respective ones of the specific features. The trained model 315 is used by the distributed game engine to determine the different functional portions of the game engine that are needed for processing the different features of the game data, as well as the type and amount of each type of resources needed to process the different features. The type and amount of each type of resources is driven by the success criteria defined for different points of time of game play of the online game and the success criteria, in turn, is dependent on the type of users, certain ones of the user metrics of the users, game state of the online game, etc. For example, the success criteria defined for a player playing the online game may be different from a success criteria defined for a spectator following the game play of a particular player or game play of the online game in general. Similarly, the success criteria defined for an experienced or highly skilled player may be different from the success criteria defined for a novice or mid-level player.

The resource allocation model 315 is built/trained using the classifier engines that are used to identify and classify the features of the game data so as to populate various nodes within the network of interconnected nodes of the resource allocation model (AI model) 315. Each classifier engine is pre-defined to identify and classify a specific one of the features in the game data. For example, if the resource allocation model 315 is to be trained for a success criterion that specifies optimal performance of the online game, specific ones of the classifier engines may be provided to identify and classify certain ones of the features that affect the performance (e.g., features, such as latency, quality of image, bandwidth, etc.). The classifier engines used to build/train the AI model learn to identify those features in the processed game data, analyze those features of game data that were processed using the functional portions of the game engine (wherein the game data used in the AI model was generated by processing historical user inputs and game states), update the nodes within the layers of interconnected nodes with information obtained from the analysis, and use the interconnects to derive an output for a specific success criterion. A success criterion may include acceptable latency, or acceptable load on each server, or preferred length of queue, or queue timing, or quality of game data, or speed of transmission, etc., or any combinations thereof. The aforementioned list of different success criteria have been provided as mere examples and should not be considered exhaustive. As mentioned earlier, some example features of game data that are processed by the functional portions of the game engine include physics, texturing, shading, assembling/encoding, audio, scripting, animation, memory management, scene graph, to name a few. Of course, there might be fewer or greater number of features that can be identified for processing in the game data. Accordingly, the functional portions of the game engine execute the related game engine tasks of processing the features identified in the game data. As a result, some functional portions of the game engine that may be used to execute the aforementioned features of game data may include physics engine, texturing module/engine, shading module/engine, assembling module, audio engine, scripting engine, animation engine, etc. The aforementioned functional portions have been provided as mere examples and should not be considered exhaustive.

The AI model is built by processing the game data and populating each node of the AI model with a feature extracted from the game data and details of resources used to process the feature. As mentioned, the game data used to populate the AI model is obtained from game play history. The generated AI model is then updated in real-time with additional game play data obtained from current or future game play sessions. The nodes in the AI model are populated with information from the processing of the game data and the sequence followed in populating the nodes of the AI model may follow the same sequence that was followed when the game data was processed by the functional portions of the game engine. That is, the processed output from a first node is transmitted with the game data to an interconnected second node for further processing wherein the first and the second nodes are identified based on the sequence followed during processing of the game data. For instance, the game data may have first initially undergone processing by a physics engine to process the physics component. Information from the physic engine processing may be uploaded to the first node and the game data with the processed physics component may be provided as input to the connected second node that relates to texturing, and the game data with the physics and texturing components may be provided to a connected third node for shading, and so on. As the game data progresses through multiple layers of interconnected nodes, the knowledge from each processed feature is gathered and an output is generated. The generated output relates to a specific success criterion. A path to the output node from the input node may be determined by one or more predefined rules that correlate with a particular success criterion. The resource allocation model 315 may generate multiple outputs by following different paths of the interconnected nodes of the AI model between the input node and the output node, with each output driven by a corresponding predefined rule that is defined to satisfy a specific success criterion. An output from the classifier engines would provide the information that is necessary to determine if the output (i.e., resource allocation) meets the pre-defined success criteria defined for the online game. For example, the information output from the resource allocation model 315 may identify user X was playing Game 1 at level J and received x level of performance, y level of latency and z level of quality. Further, the success criteria may be defined to be minimal latency, meaning that the game data has to be processed fast, assembled and encoded quickly and transmitted to make it appear that the game data was provided to the client device in real time. The outputs from the resource allocation model 315 may be analyzed by the resource allocation agent, in accordance to the pre-defined rules defining the success criteria, to determine the type of resource configuration that was used to meet the success criteria. Using this information, prediction for the different resources may be made for the online game including whether the resource configuration that is provided or identified needs to be fine-tuned for a subsequent game play session, based on a specific game state and game inputs received for the online game. The fine-tuning may include determining "when" and what type(s) of resources need to be adjusted (i.e., elastically scaled up or down) for the online game to achieve a success criterion.

Simply put, the machine learning is used to make sense of the raw input data from the users by interpreting the users' inputs using the resource allocation model (i.e., AI model). For example, the users' inputs are used to identify game state metrics and user metrics of the users. The game state metrics and the user metrics of the users are used by the machine learning algorithm to characterize the stress imposed on the various resources during game play, and such stress can change based on the game state of the online game. The machine learning algorithm generates the AI model with a neural network of nodes and populates these nodes with the resources used at various stages of game play of the online game to learn, (a) how the different features of the game data are related to one another, and (b) how the output generated by processing the different features using allocated resources relate to the success criteria defined for the online game. The classifier engines are used to identify the different features and to populate the different nodes of the AI model. Upon processing the different features using the allocated resources, the corresponding nodes are updated with the output of the processing of the specific feature of the game data. The machine learning analyzes the output from the processing of the different features to identify a pattern occurring from the processing, and to relate the output of the AI model to the success criteria defined for the online game. The analysis is done using pre-defined rules defining the success criteria. Based on the analysis, the machine learning determines if the current allocation is optimal or if select ones of the resources allocated to process certain ones of the features need to be selectively scaled (up or down) to improve the overall pattern and to better align the output to the success criteria.

When the current resource allocation is shown to be optimal (i.e., the output aligns with the success criteria defined for the online game based on the game state and users' inputs) the system may choose to maintain the current resource allocation. On the other hand, it may be determined from the analysis of the AI model that the output met the success criteria but there was an over-allocation of certain ones of the resources that remained idle. As the processing resources are costly, optimization of each and every resource provided for online game play, is important. As a result, the resource allocation agent may use the results of the analysis to send a signal to the configuration agent to scale back certain ones of the resources that are shown to be over-allocated for processing a certain feature. The machine intelligence may employ supervised learning, unsupervised learning, semi-supervised learning or any other machine learning to generate and train the resource allocation model used to align the output to the success criteria.

In one implementation, the pre-defined rules may be defined to include each of the features of the game data as a parameter to be considered and the output may be generated by using a weight assigned to each parameter of the game data (i.e., which parameter needs to be weighed more than other). The resource allocation agent may use the analysis of the AI model output, in accordance to the one or more of the pre-defined rules, to determine if the current allocation of resources is sufficient to meet the success criteria and may signal the configuration agent to proactively adjust the system resources, when it is determined that one or more resources allocated for processing a feature is not optimal. For instance, a success criterion may specify that the game data needs to be provided to a player (i.e., user that is engaged in game play) of the online game with minimal latency during subsequent game play of the online game. Based on the specified success criterion, the different outputs from the resource allocation model are analyzed to identify an output defined for a set of game inputs, with the system resource configuration that previously satisfied the specified success criterion for the game state of the game. Using information provided by the resource allocation model, the resource allocation agent determines if the allocation of resources during a current game play is sufficient to meet the specified success criterion or if the system resources need to be scaled up or down. When it is determined that the resource allocation for the current game play is not sufficient to meet the predicted demand for achieving the success criterion, a signal may be sent by the resource allocation agent to the configuration agent to proactively scale up or scale down specific ones of the system resources for the current session of game play for the online game, based on the predicted resource demand. For the above example where the success criterion for a current game play session of a player specifies minimal latency for a high level player irrespective of quality of frames of game data, the output that meets the success criterion of minimal latency for the game inputs that match the game inputs of the high level player, is identified from the resource allocation model and used to determine the current resource allocation. Upon determining the current resource allocation, the machine learning algorithm may further analyze the output to determine if the resources allocated (e.g., amount of CPU resources allocated to the game and the communication bandwidth) for the online game need to be adjusted for the current game play to meet the same success criterion. Similarly, if the success criterion specifies quality of game data returned to the client device, then the output corresponding to the quality of game data may be used to determine if certain ones of the resources assigned to the current session of the online game needs to be scaled up or down to satisfy the success criterion. Based on the determination, the resource allocation agent generates and forwards a signal to the configuration agent to adjust the resources allocated for the online game.

In order to determine if any adjustment needs to be made, the resource allocation agent 313 may interact with the configuration agent 311 to determine the current system resource allocation and to signal to the configuration agent 311 when the current system resource allocation does not match the resource allocation from the resource allocation model 315 that met the success criteria for the game state of the game. The signal to the configuration agent 311 may identify the type of resource and the type of adjustment (scaling up, scaling down, provisioning new, de-provisioning existing ones, etc.) that needs to be made to achieve the success criteria defined for the online game. The configuration agent 311, in response to the signal from the resource allocation agent 313, is configured to elastically adjust the resources appropriately.

FIG. 3 shows the various processing nodes (nodes p1 thru p8) 308 that are assigned to process specific features of the game data from the current game session. Each processing node includes an instance of game engine and game logic to process a particular functional portion of the game engine. The processing node may be a server, or a game console, or a computing device that is configured to provide the required resources for processing the particular functional portion of the game engine. For simplicity sake, each processing node shown in FIG. 3 is configured to process a specific functional portion of the game engine, whereas in reality more than one processing node may be engaged to process a specific functional portion, as will be discussed in more detail with reference to FIGS. 4A-4C.

A master node 304 may be used to synchronize the processing of the various features of the game data. A process synchronization layer 304a of the master node provides a communication interface between each of the plurality of processing nodes and each of the plurality of management nodes to manage assignment of the resources for executing the functional portions of the game engine in order to process the various features of game data. Each functional portion of the game engine represents a game engine task and the process synchronization layer 304a acts as a virtual bus to manage the functional portions of the game engine tasks based on information provided by the resource allocation model of the management nodes. Specifically, the process synchronization layer 304a manages assignment of the game engine tasks to different processing nodes, distributes the specific ones of the game engine tasks to select processing nodes, routes processed results between the select processing nodes (i.e., interconnected nodes) and between the select processing nodes and the configuration agent. Results provided to the configuration agent is used for elastically scaling the resources assigned for processing the game engine tasks, so that the output meets the success criteria. The elastically scaling may include adding additional processing nodes (e.g., additional servers) to process a particular feature, or scaling up the resources (e.g., adding or removing additional CPU cores of the server node) within the provisioned processing node. The synchronization of the game engine tasks includes managing the task queues, taking into consideration the process timing of each game engine task.

Figure 4A:
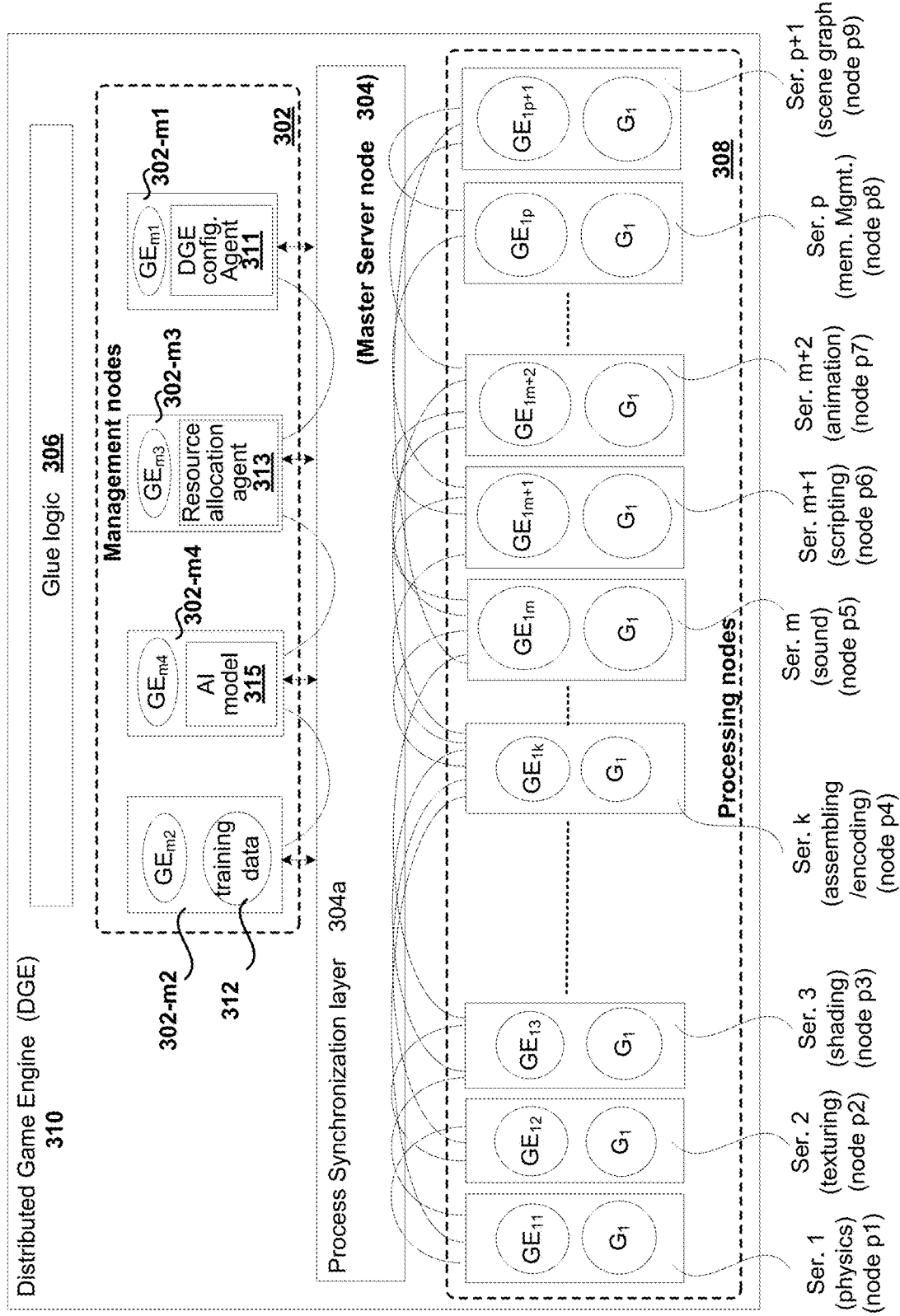
FIG. 4A illustrates a simplified block diagram of allocated processing nodes with resources for processing functional portions of the distributed game engine, in accordance with one implementation of the present disclosure.

FIG. 4A illustrates one example implementation of processing nodes that may be used in allocating resources for processing game data in order to meet success criteria defined for the online game. Each of the processing nodes is equipped with a game engine and includes the required resources for processing a specific game engine task. The implementation illustrated in FIG. 4A shows a very basic form of resource allocation with each processing node being assigned a specific game engine task for processing. Thus, node p1 is used to process physics component of game data using resources of server 1, node p2 is used to process the texturing component of game data using resources of server 2, node p3 is used to process the shading component using resources of server 3, node p4 is used to assemble and encode the game data received from different processing nodes using resources of server k, node p5 is used to process audio component (i.e., sound) using resources of server m, node p6 is used to process the scripting component using resources of server m+1, node p7 is used to process the animation component using resources of server m+2, node p8 is used to perform memory management using resources of server p, and node p9 is used to process scene graph component using resources of server p+1, to name a few. The types of game engine tasks identified in FIG. 4A are provided for illustration purposes and should not be considered as exhaustive or limiting. Fewer or additional types of game engine tasks may be identified and processed using instances of game engines executing on different servers. Each of the processing nodes may interact with other processing nodes and such interaction may be through the process synchronization layer that acts as a virtual bus. Similarly, each management node may interact with one another through the virtual bus or directly. Also, each management node may interact with one or more processing nodes through the process synchronization layer. In the example illustrated in FIG. 4A, each server is configured to perform only one game engine task. In alternate examples, more than one game engine task may be performed by a single server. Along similar lines, more than one server may be engaged to perform a game engine task.

Figure 4B:
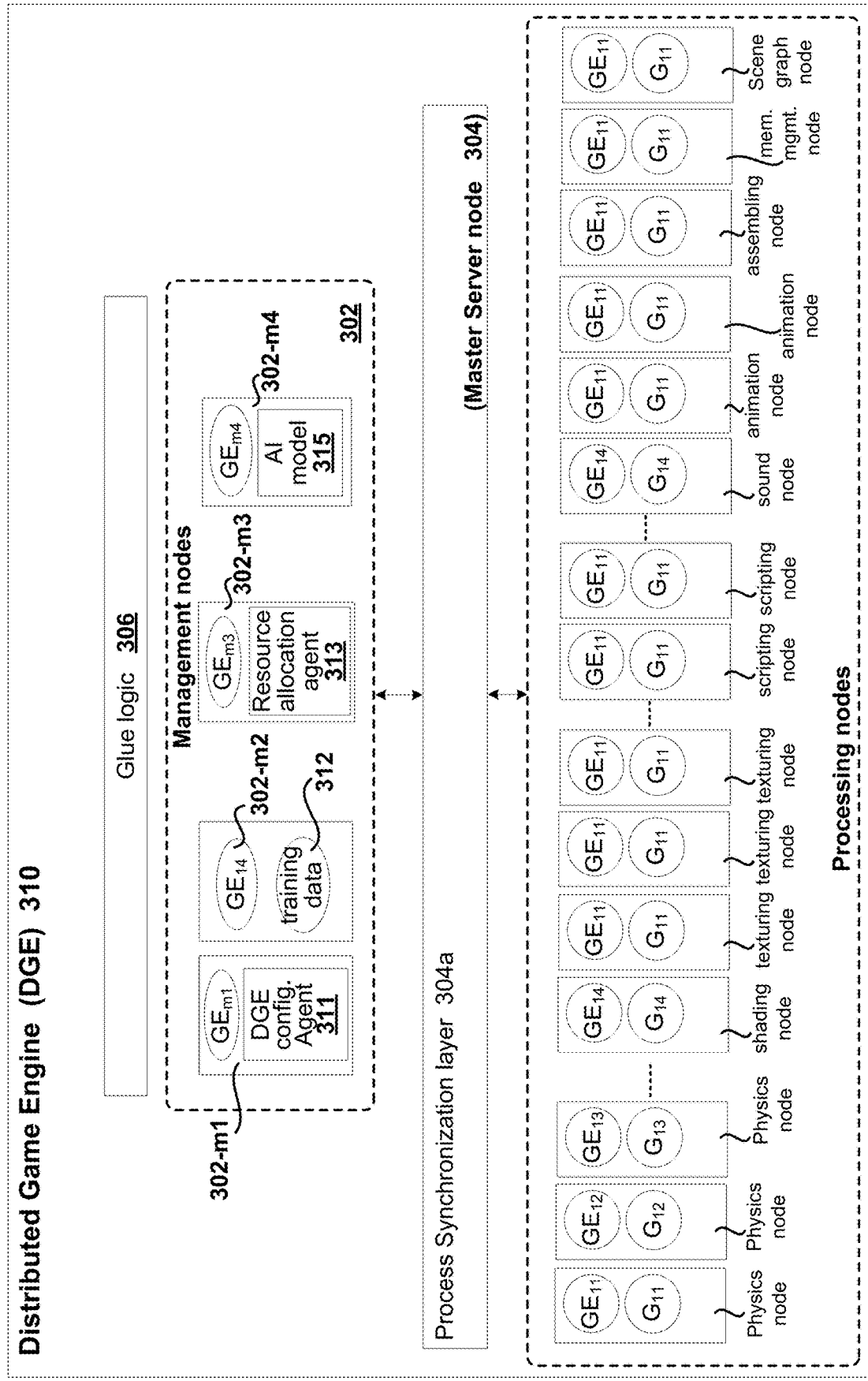
FIG. 4B illustrates an alternate implementation of processing nodes allocated for processing functional portions of the distributed game engine, in accordance with one implementation of the present disclosure.

FIG. 4B illustrates one such example. The resource allocation agent may have indicated that additional resources are required for processing specific features of the game data and, in response, the configuration agent 311 may have provisioned additional processing nodes for processing the specific features. Thus, in the example illustrated in FIG. 4B, a plurality of physics node are provisioned to provide the required processing resources for processing the physics component of the game data, a plurality of texturing nodes are provisioned to provide the required processing resources for processing texturing component, and a plurality of scripting nodes are provisioned to provide the required processing resources for processing scripting. Each of the processing nodes may include a single core processor or multicore processor, defined bandwidth or single sub-component or multiple sub-components for processing the respective components. The remaining components of the game data may be processed using processing resources of a server associated with the respective single processing node.

Figure 4C:
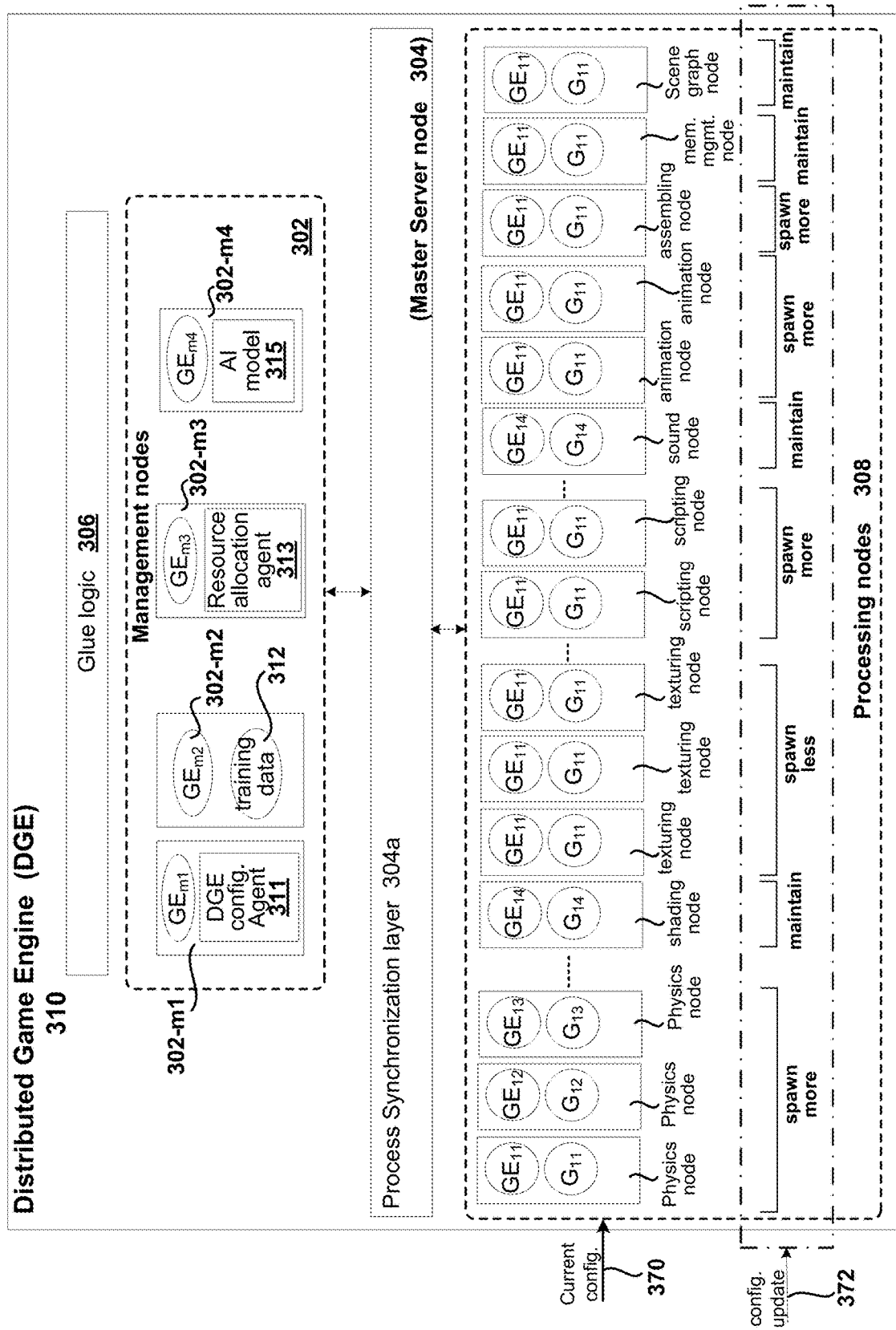
FIG. 4C illustrates a simplified block diagram showing updates to configuration of processing nodes used for processing functional portions of the distributed game engine, in accordance with one implementation of the present disclosure.

FIG. 4C illustrates the signal that may be generated by the resource allocation agent after analyzing the output of the resource allocation model 315, for the success criteria defined for the game. The success criteria may be driven by one or more game state metrics, such as game type, game state of the game, amount of game data generated, etc., and one or more user metrics, such as type of user (developer, player or spectator), expertise level of the user, etc. For example, for a high intensity game played by an expert player, the success criteria may be defined to be provisioning game data with minimal latency. For a spectator, the success criteria may be to provide a common view window that is provided to all spectators for viewing game play of the online game, or a customized view window for independently navigating through the game scene of a game play, or a separate view window that allows the spectator to independently follow game play of an expert player, or a view window that allows an expert player to act as a spectator and follow game play of a novice player and provide guidance, etc. Based on the success criteria, the outputs are identified from the allocation model 315 and the resources of the system are adjusted to provide the desired game play experience for each user of the online game. In the example illustrated in FIG. 4C, the resource allocation agent may analyze the output of the resource allocation model 315 to obtain the current configuration 370 of the online game and to provide a signal with configuration update 372 in order to meet the success criteria defined for the online game, based on a current game state of the online game and the current configuration 370. As shown, the signal communicated by the resource allocation agent 313 to the configuration agent 311 may indicate that the processing nodes used for processing physics component, scripting component, animation component and assembling need to be spawned more, while amount of processing nodes allocated for shading, sound, memory management and scene graph is to be maintained at the current level, and the number of processing nodes used for processing the texturing component needs to be scaled down. The signal transmitted by the resource allocation agent is based on the predicted demand for different resources identified from the analysis of the AI model, based on success criteria, and is used to ensure that the necessary resources are provisioned for the online game in a timely manner, in anticipation of the predicted demand, so that when the users interact with the online game, the game data is processed using the allocated resources, in accordance to the success criteria defined for the user metrics of the user and game state metrics of the online game, and returned to the client devices of the users presented.

Figure 5:
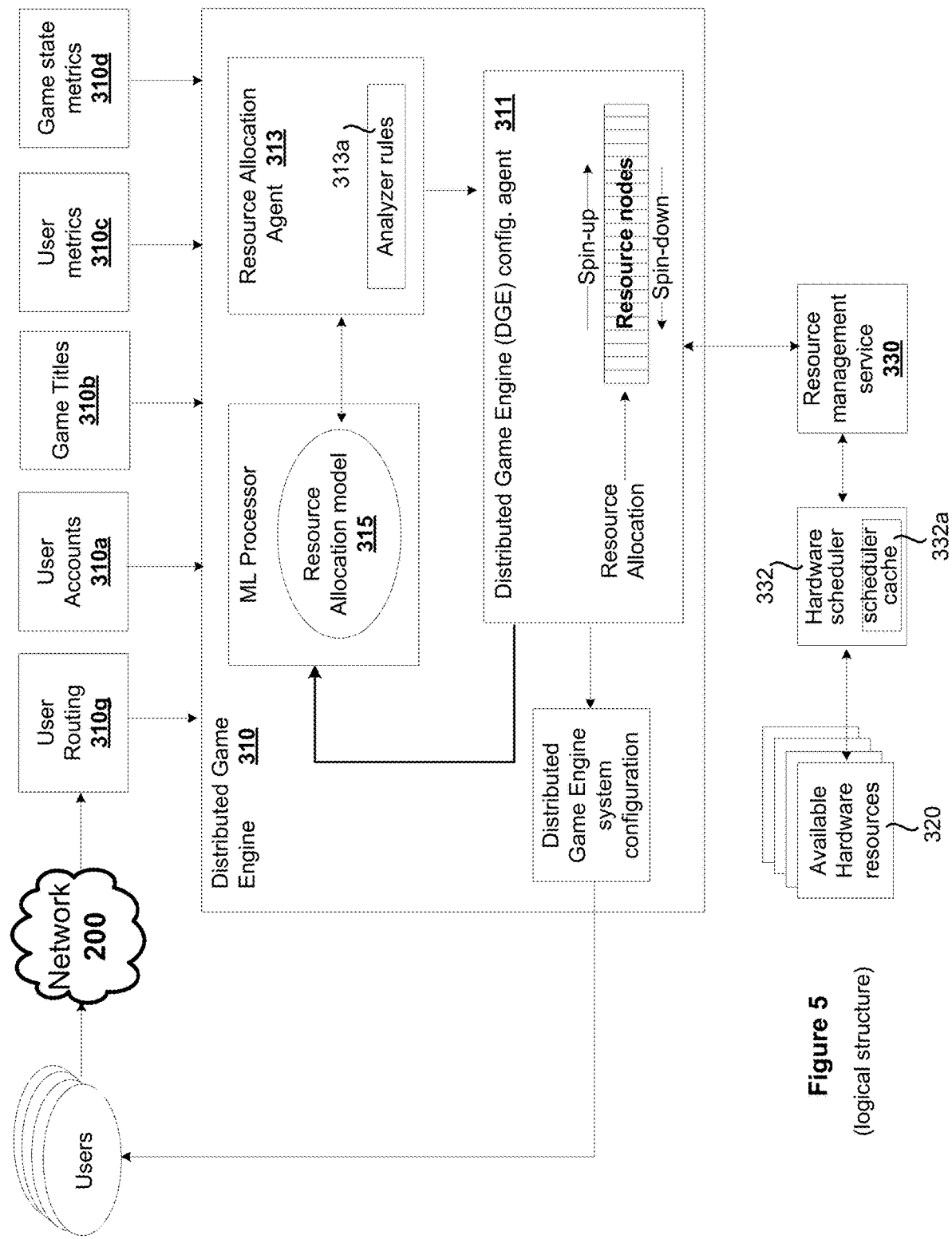
FIG. 5 illustrates a simplified block diagram of a logical structure of the game cloud system that engages a distributed game engine to provision resources for an online game, in accordance with one implementation of the present disclosure.

FIG. 5 illustrates an example logical structure of a game cloud system that is used for provisioning resources for an online game in anticipation of the predicted demand, based on analysis of the training data collected during prior game play of the online game. The online game is a massive multiplayer online (MMO) game that is played simultaneously by a plurality of users. The game is executed on a game cloud system and is accessed over a network 200, such as Internet. Users accessing the online game are verified against the corresponding user profiles maintained in user accounts 310a. The verification is used to identify game titles of online games 310b that the users are authorized to access. Upon successful verification, the users are allowed to access an online game for game play. The users may be accessing the online game from different geo locations and the game cloud system provides access to the online game by instantiating the online game across a network of servers distributed geographically. A distributed game engine 310 is used to execute the game logic of the online game. Instantiating the online game includes executing instances of the game engine 310e and game logic 310f on each one of the network of servers. The game engine provides necessary engines/modules to process different functional portions of the game engine, wherein each functional portion is configured to process a corresponding feature of game data. For example, a physics engine may be provided to process a physics component of game data, a shading engine may be provided to process a shading component, and so on.

User inputs during game play of the online game is collected from the plurality of users and used to affect game state of the game and generate game data for returning to the client devices for rendering. Users' inputs are used to update the user metrics 310c of the users and the game state of the game is updated to game state metrics 310d. The user metrics 310c of the users and game state metrics 310d are used by the distributed game engine 310 to generate a resource allocation model 315 (an AI model). The resource allocation model 315 is used to predict demand for resources for the online game and to proactively scale the necessary resources ahead of time in anticipation that the resources will be used during game play of the online game. The predicted demand identifies resources that need to be scaled up and resources that need to be scaled down.

As previously mentioned, the distributed game engine manages the game logic that affects the outcome of a game executed on a game cloud system and provides a plurality of reusable components for processing certain core features of the online game that are used to bring the online game to life. The core features processed by the reusable components of the game engine include graphics, audio, physics, artificial intelligence, scripting, animation, networking, streaming, optimization, memory management, threading, localization support, to name a few. The game logic determines the game state (i.e., outcome) of the game, based on the inputs received from the users. The game data generated from the execution of the online game includes the processed features that bring the game to life as well as the outcome of the game.

The distributed game engine, in addition to processing the core features of the online game, uses machine learning algorithm to update a neural network of nodes of the AI model 315 using the game data of the online game. The machine learning algorithm includes classifiers that are used to provide output to generate/refine the resource allocation model. Each classifier has an engine/module that is configured to identify and process a specific feature of the game data, and update the corresponding node of the AI model with information related to the processing of the feature and the resources used for processing the feature. The processed information is forwarded along with the game data downstream to other classifiers for further processing. For example, a classifier may be built to determine quality of physics feature. Another one may be built to determine quality of shading. Yet another one may be built to manage threading (i.e., identify number of game slices processing different features that exist and how they are interconnected, processing time of the game slices associated with different features, number of game slices for a specific feature in the queue, etc.). Other classifiers may be built to identify the quality of texturing, memory management, scripting, scene graph, animation, to name a few.

The neural network includes a plurality of nodes with two consecutive nodes connected via an edge. A node can be connected to other nodes via different edges. The edges leading from the input node through a set of interconnected nodes to an output node define a path. There can be a number of paths defined between the input node and the output node, based on the interconnecting edges. Using the AI model, the game data, generated in response to the users' inputs during game play of an online game, is processed through the network of interconnected nodes (i.e., hidden nodes) that connects the input node to the output node. Each node is used to analyze the game data to determine effectiveness of processing specific feature of the game data and to determine consistency in a pattern realized from processing the game data. For example, the pattern may indicate that the quality of physics or texturing or shading was/was not optimal, the audio was/was not consistently clear, there was acceptable/unacceptable latency from the threading of game slices, etc. The resource allocation agent 313 analyzes the pattern provided by the classifiers of the AI model using a set of predefined analyzer rules 313a to derive an output. The output indicates if a particular success criterion was met or not met, and whether the resources provided were sufficient or need to be scaled up/down. The AI model provides a mapping of the game data to different outputs by following the different paths of the interconnected nodes and identifying patterns. The outputs from the different paths may relate to the success criteria of the online game that was met or not met for the game states. Further, each of the outputs identifies the types and amount of resources of each type that were provided for processing each feature of the game data processed along the respective path. Based on the analysis, the resource allocation agent generates a signal to the distributed game engine configuration agent 311 to spin-up or spin down the resources.

The configuration agent may engage a resource management service 330 to manage allocation of the resources for the online game. The resource management service 330 interacts with a hardware scheduler 332 to determine the status of each of the hardware resources 320 available in the game cloud system. A scheduler cache 332a within the hardware scheduler 332 may identify which ones of the resources are currently assigned to perform a job (i.e., game engine task), which resources are scheduled to be assigned to a job, which ones of the resources are free, resource capabilities, etc. Based on the information obtained from the hardware scheduler 332, the resource management service 330 may identify specific ones of resources that are available for allocation to perform the game engine task. Using the information shared by the resource management service 330, the configuration agent 311 may allocate the resources for processing certain ones of the features of the game data for the online game. When new users join a game session, the distributed game engine system configuration is used in routing the new users, so that the users of the online game can have a satisfying game play experience.

Figures 6A, 6B, 6C:
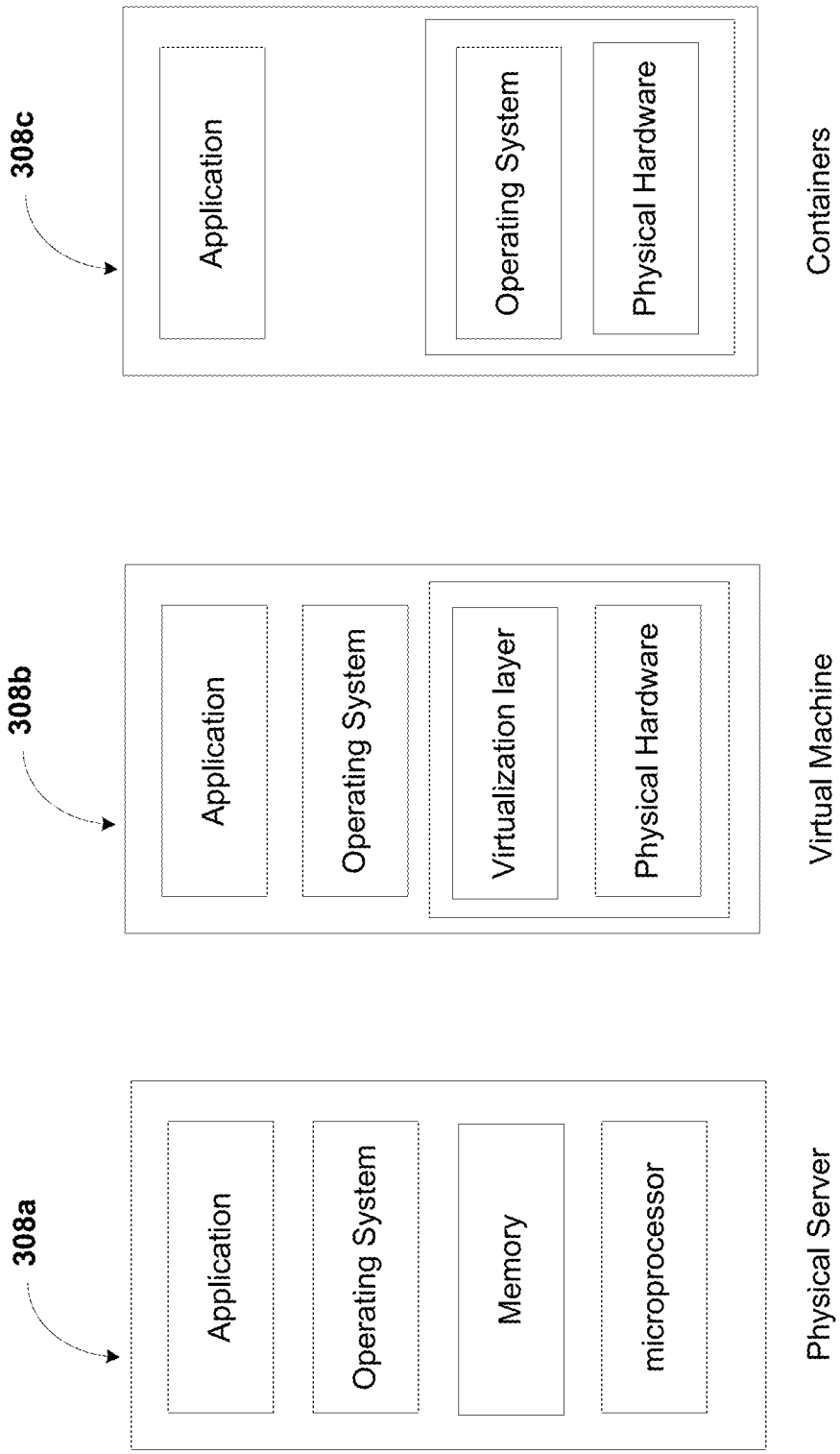
FIGS. 6A-6C illustrate various types of processing node servers used for provisioning resources for processing functional portions of the distributed game engine for the online game, in accordance with one implementation of the present disclosure.

FIGS. 6A-6C illustrate various types of servers that can be provisioned for instantiating a game engine and game logic and for processing a feature of the game data generated for the online game, in some example implementations. As shown in FIG. 6A, the server can be a physical server 308a. The server 308a may be a stand-alone server or may be part of a data center within the game cloud system. The server in the data center may be an independent server with in the data center or be part of a rack, with each rack containing multiple server computing devices. More information about a server rack will be discussed with reference to FIG. 7. The physical server includes the necessary resources, such as operating system, memory, microprocessor for executing one or more applications and/or one or more functional portions of the game engine. The applications or functional portions of the game engine are stored in the memory, processed using the microprocessor and managed by the operating system.

In a game world, users may be accessing and playing a MMO game from any geo location but may come together in one virtual game space. A plurality of servers may be engaged to provide the users with faster access to the online game play. The game states resulting from game play of the online game executing on the different servers, have to be shared amongst the servers in a fast and efficient manner so that the users who are in the virtual game space or viewing the game play in the virtual game space are provided with their own (i.e., each user's own) perspective of the game scene in substantial real time. In one implementation, to provide faster access to the game data, instances of the distributed game engine may be executed on different servers that are part of a single data center. This configuration works efficiently as data can be exchanged between the different servers within the data center without much latency. Details of the network architecture used in exchanging data between servers of a single data center will be discussed in more detail with reference to FIG. 7. In an alternate implementation, the plurality of servers executing instances of the distributed game engine and game logic may be part of a plurality of data centers that are distributed geographically. In such implementation, the game states resulting from game play of the online game are exchanged amongst the servers in the different servers so that the users can be provided with their own perspective of the game scene. There may be a little latency involved during exchange of the game states but resources may be provided to reduce the latency.

As illustrated in FIG. 6B, the server could be a virtual machine that is part of the game cloud system. The game cloud system may include a plurality of virtual machines (VMs) 308b running on a hypervisor of a host machine, with one or more virtual machines configured to support game processors that execute an instance of an online game utilizing the hardware resources available to the hypervisor of the host. When a plurality of game processors associated with a plurality of virtual machines execute instances of the online game, the users' inputs are collected, organized by one or more back-end servers (i.e., physical servers or virtual servers) of the game cloud system and processed to affect game state of the online game. The game data generated by the online game in response to the users' inputs are assembled, encoded and forwarded as streaming frames of game data to the users' client devices for rendering. The users' inputs are also used to generate training data for training the AI model, which is used to manage the resources for the online game. Each of the virtual machine may include one or more applications (e.g., one or more online game applications), that is executed by an operating system using the hardware resources available to the virtualization layer (i.e., hypervisor) of the host machine.

FIG. 6C illustrates another example of a server that can be used for provisioning resources for the online game, in one implementation. The server could be part of a cloud container 308c that allows an application, such as the online game application, and all its dependencies, libraries, and configuration files that are needed to run the online game application, to be bundled together into a virtual container with the application using the allocated resources within the container to run the application. The container operates without a full operating system, thereby providing an operating system-level virtualization. The container is capable of operating with minimum amount of resources to perform a task, such as executing an instance of a game engine and game logic for an online game, wherein the resources (i.e., physical hardware resources) are virtualized. The cloud container is portable as it can be fully deployed to different servers. In one implementation, the container provides application isolation through process and namespace isolation technology by sharing a kernel with the container host. In an alternative implementation, the kernel of the container host is not shared, thereby providing enhanced isolation by running the containerized application from a virtual machine. The aforementioned types of servers are provided as mere examples and should not be considered restrictive. Other forms of servers or computing devices that provide the resources for instantiating a game engine and game logic may also be used.

Figure 7:
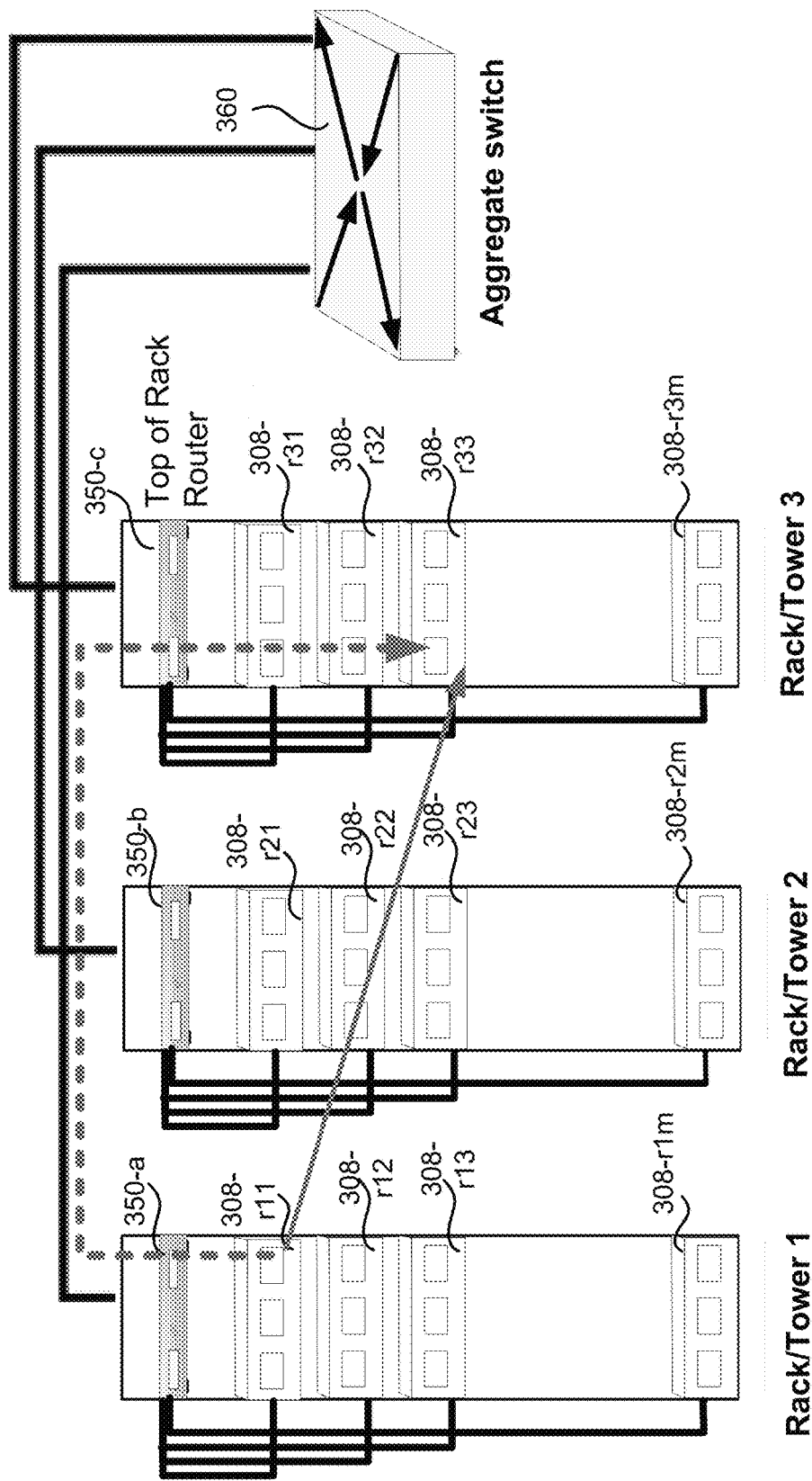
FIG. 7 illustrates a simplified block diagram of server racks within a data center that can be used for provisioning resources, in accordance with one implementation of the present disclosure.

FIG. 7 illustrates an example data center in which a server used to run the online game is located, in one implementation. The server could be part of a plurality of servers (308-r11 through 308-r1m, 308-r21 through 308-r2m, 308-r31 through 308-r3m, and so on) that are networked together to provide the necessary compute power for executing an online application, such as a massive multiplayer online (MMO) game. The data center includes a plurality of racks (or towers) of servers and/or storage equipment. FIG. 7 shows 3 racks/towers (racks 1-3). However, the data center could include more than three racks and sometimes hundreds of racks of servers/storage equipment. The racks in the data center can be networked using a top-of-rack (TOR) design or end-of-row (EOR) design.

In the TOR design, each rack/tower includes a rack router (router 350-a for rack 1, 350-b for rack 2, 350-c for rack 3, and so on) placed at the top of the respective rack and the computing devices (i.e., servers/storage equipment) of each rack are connected to the respective rack router. Each of the rack routers, in turn, is connected to an aggregate switch 360. Data exchanged between the servers in different racks within the data center flow through the respective rack routers (350-a through 350-c) while the data exchanged between the servers within different data centers or between the data center and another computing device outside the data center flow through the respective rack routers (350-a through 350-c) and the corresponding aggregate switch 360. For example, when processing of game data for the online game needs to be moved within the data center from server 1 (308-r11) in rack 1 to server 3 (308-r33) in rack 3 (shown by solid red line) in order to be closer to other data generated from the game play of the online game, the transfer process goes as follows: (a) Server 308-r33 is spun-up, if not already up and running, (b) data in server 1 (308-r11) of rack 1 is transferred to server 3 (308-r33) of rack 3 and the data is synchronized between server 1 308-r11 and server 3 308-r33, wherein the transfer and synchronization of data is handled via the respective top-of-rack routers 350-a and 350-c, and (c) control is handed over to server 3 (see red dotted line in FIG. 7). One advantage of using the top-of-rack design approach is that the cabling complexity is minimized as all the servers of a particular rack are connected to the corresponding top-of-rack router of the particular rack, and only limited number of cables extend out to connect to other racks and to the aggregate switch. Other advantages, such as requiring lesser amount of cables, modular deployment of data-center racks as each data center rack comes with in-built cabling, etc., can be evidenced by one skilled in the art.

On the other hand, in the EOR network design, each server in individual rack is connected to a common EOR aggregate switch directly—i.e., the connection is direct and is not through the individual TOR router of the respective racks. As a result data flow is through the EOR aggregate switch. Some advantage of this approach is that expansion of servers in the data center can be carried out easily and placement of the servers can be carried out independently without having to consider any server rack constraints, latency is minimized as data passes through lesser number of routers/switches. Other advantages of this design implementation can be envisioned by one skilled in the art.

In some implementations, users may connect to the online game application of the cloud game system from anywhere in the world. The online game application enables such connection by initiating multiple game instances on different servers of different data centers distributed across the world. The users' input data generated at the respective client devices during game play of online game are collected from the network of servers and frames of game data are returned to the respective client devices, using any one of network models. Some examples of network models that may be used to communicate between servers of the game cloud system described in this application include a TCP/IP network model or International organization of Standardization (ISO) based open system interconnection (OSI) network architecture. The data processing and communication between the distributed servers may follow any one of a plurality of existing protocols. The ISO model includes a set of application layers (Application layer, Presentation layer, Session layer) and data flow layers (transport layer, network layer, data link layer and physical layer). The application layers are configured to identify the transmitting and receiving entities, transfer data of an application, such as the online game, between the transmitting and receiving entities in a manner that is understood by the respective entities, and to manage and synchronize communication between the transmitting and receiving entities with minimal data loss. The data flow layers are configured to determine if data transmission should be carried out in sequential or parallel path, a protocol that is to be followed for packetizing the data, assembling the packetized data into frames and transmitting the frames of data along a preferred route. It should be noted that the above mentioned description provides only an overview of the ISO model used in communicating the data through the network of servers for the online game and that the finer details of the role of the various layers are understood by one skilled in the art, and is therefore not described in greater detail.

Figure 8:
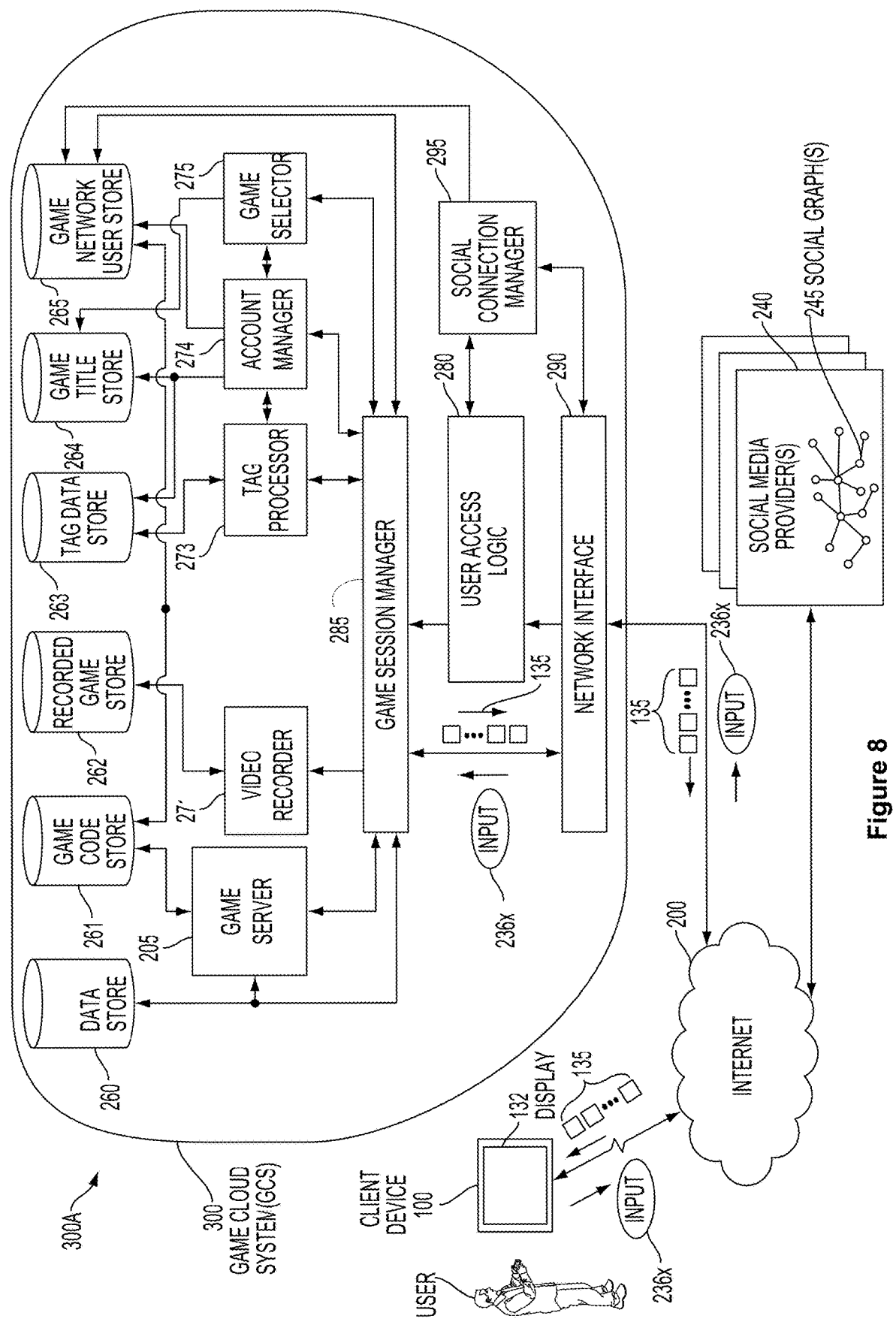
FIG. 8 illustrates a system diagram of a cloud gaming system used for executing an online game and to provide frames of game data over a cloud game network to one or more client devices, in accordance with one implementation of the present disclosure.

FIG. 8 illustrates an overview of an example system 300A supporting the collection of user inputs to update training data and using the updated training data to build and/or train resource allocation model relating to game play of an online game, in accordance with one implementation of the present disclosure. In particular, system diagram 300A enables accessing and playing of video games stored in a game cloud system (GCS) 300. Generally speaking, game cloud system GCS 300 may be a cloud computing system operating over a network 200 to support a plurality of players playing a online game application through corresponding game plays. Data related to those game plays may be provided as training data used for building and/or training an AI model relating to game plays of the online game application. In particular, system 300A includes GCS 300, one or more social media providers 240, and a client device 100, all of which are connected via a network 200 (e.g., internet). A plurality of client devices associated with a plurality of users may be connected to network 200 to access services provided by GCS 300 and social media providers 240. The users may be players or spectators that follow game play of a particular player or of the online game.

In one embodiment, game cloud system 300 includes a game server 205, a video recorder 271, a tag processor 273, and account manager 274 that includes a user profile manager, a game selection engine (i.e., game selector) 275, a game session manager 285, user access logic 280, a network interface 290, and a social connection manager 295. GCS 300 may further include a plurality of storage systems, such as a game state store, user accounts, user data store, etc., which may be stored generally in datastore 260. Other game storage systems may include a game code store 261, a recorded game store 262, a tag data store 263, video game title store 264, and a game network user store 265. In one embodiment, GCS 300 is a system that can provide online game applications, services, gaming related digital content, and interconnectivity among systems, applications, users, and social networks. GCS 300 may communicate with user device 100 and social media providers 240 through social connection manager 295 via network interface 290. Social connection manager 295 may be configured to relate one or more friends. In one embodiment, each social media provider 240 includes at least one social graph 245 that shows user social network connections.

A player (i.e., user) is able to access services provided by GCS 300 via the game session manager 285. For example, account manager 274 enables authentication and access by a player to game titles on the GCS 300. Account manager 274 stores information about users (players, spectators) and manages the user profile for each user. User information can be used by the account manager 274 for authentication purposes. Additionally, game titles owned by a user may be managed by account manager 274. For example, video games stored in game title store 264 are made available to a user who owns or is provided access to those video games.

In one embodiment, a user can access the services provided by GCS 300 and social media providers 240 by way of client device 100 through connections over network 200. Client device 100 can include any type of device having a processor and memory, wired or wireless, portable or not portable. In one embodiment, client device 100 can be in the form of a smartphone, a tablet computer, or hybrids that provide touch screen capability in a portable form factor. One exemplary client device can include a portable phone device that runs an operating system and is provided with access to various applications (apps) that may be obtained over network 200, and executed on the local portable device (e.g., smartphone, tablet, laptop, desktop, etc.).

Client device 100 includes a display 132 that acts as an interface for user to send input commands 236 and display data and/or information 135 received from GCS 300 and social media providers 240. Display 132 can be configured as a touch-screen, or a display typically provided by a flat-panel display, a cathode ray tube (CRT), or other device capable of rendering a display. Alternatively, the client device 100 can have its display 132 separate from the device, similar to a desktop computer or a laptop computer.

In one embodiment, client device 100 is configured to communicate with GCS 300 to enable user (player) to play a video game. For example, player may select (e.g., by game title, etc.) a video game that is available in the game title data store 264 via the game selection engine 275. The selected video game is enabled and an instance of the video game is loaded for execution by game server 205 on the GCS 300. In one embodiment, game play is primarily executed in the GCS 300, such that client device 100 will receive a stream of game video frames 135 from GCS 300, and user input commands 236 for driving the game play is transmitted back to the GCS 300. The received video frames 135 from the streaming game play are rendered on display 132 of client device 100.

In one embodiment, after the player chooses an available game title to play, a game session for the chosen game title may be initiated by the player through game session manager 285. Game session manager 285 first accesses game state store in data store 260 to retrieve the saved game state of the last session played by the player (for the selected game), if any, so that the player can restart game play from a previous game play stop point. Once the resume or start point is identified, the game session manager 285 may inform game execution engine in game server 205 to execute the game code of the chosen game title from game code store 261. After a game session is initiated, game session manager 285 may pass the game video frames 135 (i.e., streaming video data), via network interface 290 to a client device, e.g., client device 100.

During game play, game session manager 285 may communicate with game server 205, recording engine in the video recorder 271, and tag processor 273 to generate or save a recording (e.g., video) of the game play or game play session. In one embodiment, the video recording of the game play can include tag content entered or provided during game play, and other game related metadata. Tag content may also be saved via snapshots. The video recording of game play, along with any game metrics corresponding to that game play, may be saved in recorded game store 262. Any tag content may be saved in tag data store 263.

During game play, game session manager 285 may communicate with game server 205 to deliver and obtain user input commands 236 that are used to influence the outcome of a corresponding game play of the video game. Input commands 236 entered by player may be transmitted from client device 100 to game session manager 285 of GCS 300. Input commands (e.g., controller inputs or user inputs) 236, including input commands used to drive game play and user interactive input, such as tag content (e.g., texts, images, video recording clips, etc.). Game input commands as well as any user play metrics (how long the user plays the game, etc.) may be stored in game network user store. Select information related to game play for the video game may be used to enable multiple features that may be available to the user.

Accordingly, the present disclosure described systems and methods implementing machine learning (also referred to as deep learning) algorithm to build an AI model using training data collected from a network of servers executing instances of an online game application supporting one or more game plays, and for using the trained AI model to provide various functionalities relating to the online game application and/or game plays of the online game application, in various embodiments.

As mentioned earlier, the AI model is built using a network of interconnected nodes. Each node learns some information from game data that is provided as input to the AI model. Knowledge is exchanged between the different nodes within the network through the interconnections. Game data input to the AI model activates an initial set of nodes in the network. In turn, this initial set of nodes activates other nodes, thereby propagating knowledge from one node to the next about the game input. This activation process is repeated across other nodes, thereby building on the knowledge, to provide an output. The output represents expected or predicted outcome for given set of game data, wherein the given set of training data includes a particular set of users' inputs and game state of the online game. The outputs from the AI model can then be used to refine the allocation of the processing nodes (i.e., server resources for processing a particular feature of game data) so as to meet the success criteria, during subsequent execution of the online game. As the game data used for training the AI model relates to the game play of the online game, the AI model is trained to learn every possible configuration of resources that may be used to obtain different outputs of the game play of the online game associated with different success criteria. Thus, when the AI model is given a set of game data (e.g., users' inputs, game states, etc.,) related to a subsequent game play of the online game, the AI model can provide an output that most aligns with the success criteria for that game play. The AI model may be generated through various machine learning (i.e., AI) algorithms, including deep learning (i.e., machine learning), reinforcement learning, supervised learning, unsupervised learning, semi-supervised learning, incremental learning, rewards based learning, etc. The types of AI algorithm listed above are just given for purposes of illustration and is not exhaustive or limiting. Classifier engines are used to identify features for the nodes of the AI model and a rule links a given set of features associated with the nodes to a specific output. For example, in a supervised learning environment, the output is predetermined for a given set of features, and the deep learning engine learns the rule that links the set of features to the output, wherein each rule is associated with an output and a success criterion is applied to define the rule. In an unsupervised learning environment, the given set of features are not automatically tied to an output, but the rule may be learned by looking for similarities, or clusters of data points relating to other similar sets of features. The deep learning may use the supervised learning to build the initial AI model and an unsupervised learning to refine the AI model. The trained AI model is used for determining current resource allocation for the online game, the predicted resource allocation for a given success criterion and elastically adjusting the resources allocated for the online game in order to obtain the desired outcome during game play of the online game.

Figure 9:
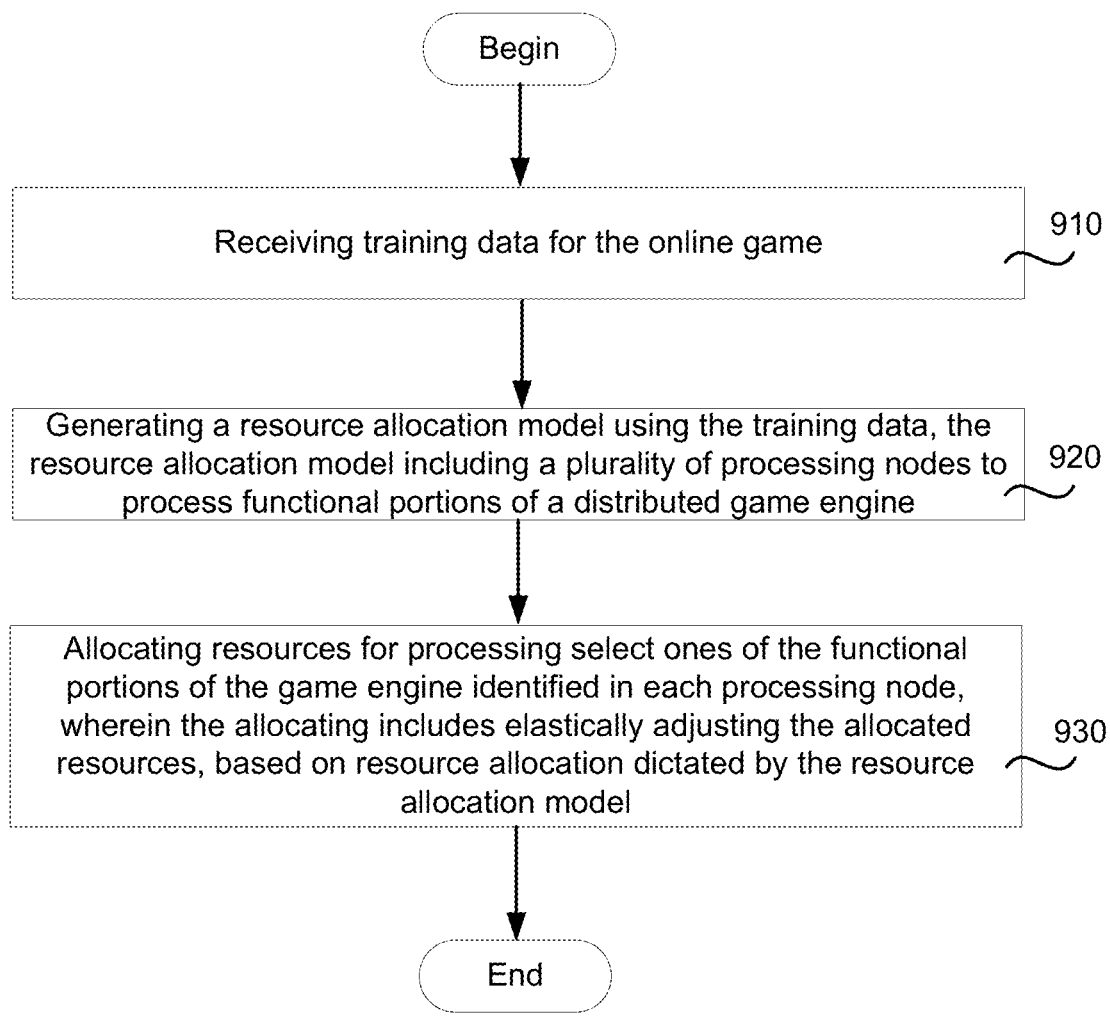
FIG. 9 illustrates flow operations of a method for provisioning resources for the online game, using a resource allocation model, in accordance with one implementation of the present disclosure.

FIG. 9 illustrates a sample flow operations of a method for provisioning resources for game play of an online game, in accordance with one implementation. The method begins at operation 910 wherein training data for the online game, is received. The online game is a multi-player game with a plurality of players accessing the online game to participate in a game play session. The players may access the online game for game play from anywhere. As a result, a plurality of instances of the online game, including game engine and game logic of the online game, are executed on a plurality of servers and game data from the online game generated from the execution of the online game are forwarded to respective ones of the client devices of the players. In addition to the players, a plurality of spectators may also access the online game to follow game play of a particular player or game play of the online game. The users' inputs during the game play are collected from the plurality of players by a game server of a game cloud system and processed to affect the game states of the online game and to generate game data. The training data includes users' inputs and game states of the online game, as well as a success criteria defined for the online game.

A resource allocation model is generated using the training data, as illustrated in operation 920. The resource allocation model is generated using an artificial intelligence (AI) modeler that engages machine learning algorithm. The modeler identifies functional portions of a distributed game engine that are used to process specific features of game data generated for the online game and uploads information related to the functional portions to specific ones of a plurality of nodes of the AI model that are interconnected. The information uploaded to the nodes may include the functional portion of the game engine that is used to process specific features of the game data, type and amount of resources that were used to process the specific features, based on a game state of the online game and users' inputs, and whether the success criteria defined for the game state of the online game was met or not met.

Using the information provided by the resource allocation model, resources are allocated for executing the functional portions for the online game, as illustrated in operation 930. The functional portions perform select ones of game engine tasks related to specific ones of features of the game data. The allocated resources provide sufficient resources for processing the respective game engine tasks and the type and amount of resources allocated for executing the functional portions is dictated by the resource allocation model.

The allocating of resources may include managing assignment of select ones of the processing nodes identified to process specific game engine tasks, distribute the specific game engine tasks to the select processing nodes for processing, route the processed results between the select processing nodes and remaining ones of the plurality of processing nodes and between the select processing nodes and a configuration agent, and synchronize the processing of the game engine tasks distributed amongst the plurality of processing nodes. The allocation of the processing nodes is done to provide optimal resources to successfully process the game data to meet the success criteria defined for the online game so that the users of the online game have a satisfactory game play experience.

Figure 10:
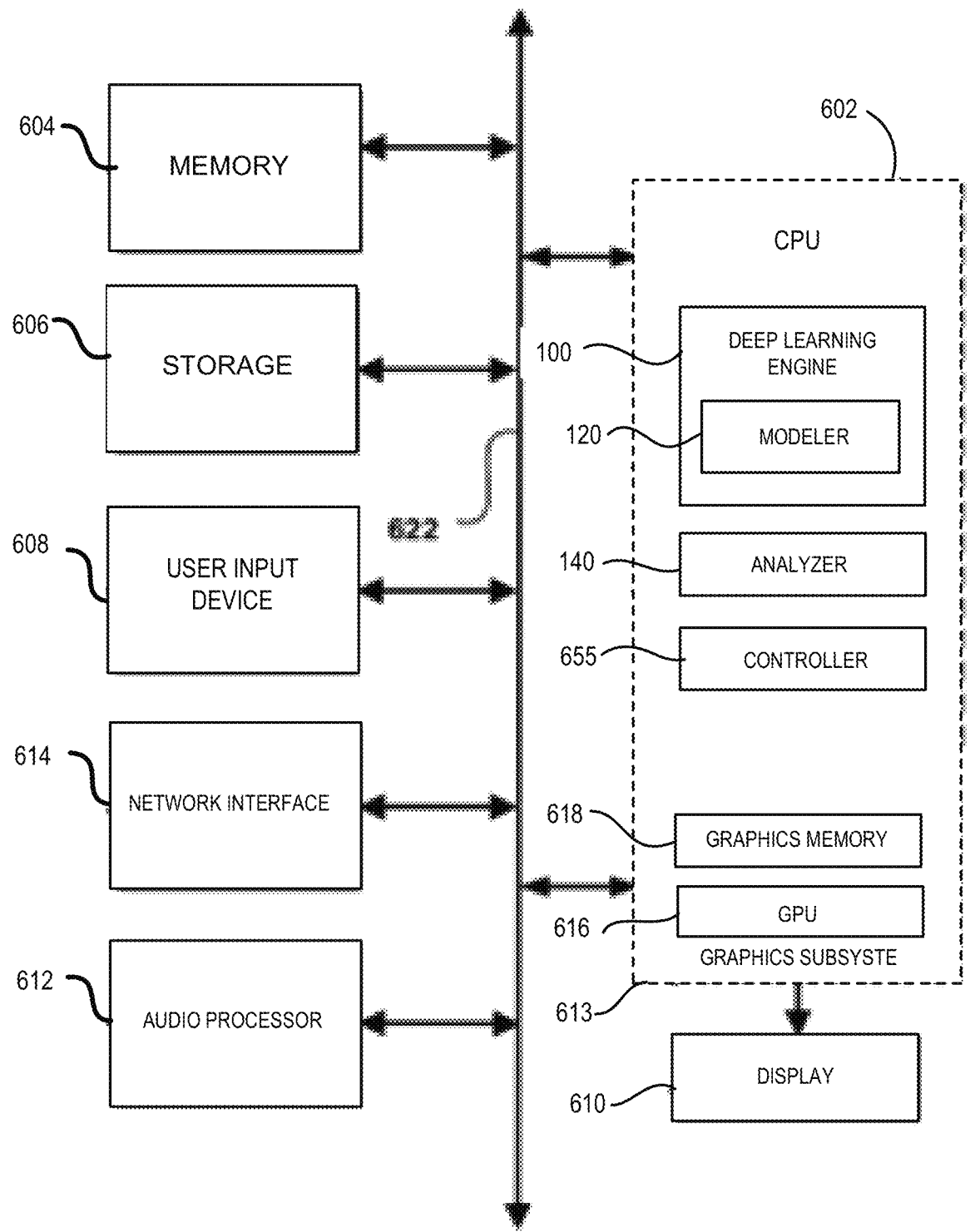
FIG. 10 illustrates components of an example computing device used for building and training a resource allocation model (artificial intelligence (AI) model) using a modeler, in accordance with one implementation of the present disclosure.

FIG. 10 illustrates components of an example device 600 that can be used to perform aspects of the various embodiments of the present disclosure. For example, FIG. 10 illustrates an exemplary hardware system suitable for training an AI model that is capable of performing various functionalities in relation to an online game and/or game plays of the online game, in accordance with one embodiment of the present disclosure. This block diagram illustrates a device 600 that can incorporate or can be a personal computer, a server computer, gaming console, mobile device, or other digital device, each of which is suitable for practicing an embodiment of the invention. Alternately, the functionalities of the device could be implemented in a physical server or on a virtual machine or a container server. Device 600 includes a central processing unit (CPU) 602 for running software applications and optionally an operating system. CPU 602 may be comprised of one or more homogeneous or heterogeneous processing cores.

In accordance with various embodiments, CPU 602 is one or more general-purpose microprocessors having one or more processing cores. Further embodiments can be implemented using one or more CPUs with microprocessor architectures specifically adapted for highly parallel and computationally intensive applications, such as media and interactive entertainment applications, of applications configured for deep learning, content classification, and user classifications. For example, CPU 602 may be configured to include the AI engine that is configured to support and/or perform learning operations with regards to providing various functionalities (e.g., predicting) in relation to an online game and/or game plays of the online game. The deep leaning engine may include a modeler 120 that is configured for building and/or training the AI model that is configured to provide the various functionalities related to the online game and/or game plays of the online game. Further, the CPU 602 includes an analyzer 140 that is configured for generating and training an AI model. The trained AI model provides an output in response to a particular set of users' inputs, wherein the output is dependent on the predefined functionality of the trained AI model. The trained AI model may be used to determine the resource allocation that is to be implemented during the game play to meet the success criteria defined for the online game. The analyzer 140 is configured to perform various functionalities in relation to the online game and/or game plays of the online game, including analyzing the output from the trained AI model 160 for a given input (e.g., controller input, game state data, success criteria), and provide a response.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, game controllers, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 613 is further connected with data bus 622 and the components of the device 600. The graphics subsystem 613 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 616, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs. In one embodiment, GPU 616 may be implemented within AI engine to provide additional processing power, such as for the AI or deep learning functionality.

The graphics subsystem 613 periodically outputs pixel data for an image from graphics memory 618 to be displayed on display device 610, or to be projected by projection system 640. Display device 610 can be any device capable of displaying visual information in response to a signal from the device 600, including CRT, LCD, plasma, and OLED displays. Device 600 can provide the display device 610 with an analog or digital signal, for example.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

The invention claimed is:

1. A computing system having a memory to store a distributed game engine and a processor to execute the distributed game engine, the distributed game engine, when executed by the processor, is configured to provision resources for an online game, the distributed game engine comprising:

a resource allocation model constructed using machine learning algorithm with game play training data collected from prior game play session of the online game, the game play training data includes inputs received from users during the prior game play session of the online game, game states of the online game, and success criteria, outputs of the resource allocation model used to identify types of resources and an amount of each type of resource that were required to satisfy different success criteria for the online game;

a resource allocation agent for analyzing the outputs of the resource allocation model to identify an output defining configuration of types of resources and an amount of each type of resource that were assigned to satisfy the success criteria defined for the online game during prior game play sessions, wherein each type of resource identified is configured to process a specific feature of the game play training data of the online game, the specific feature corresponding with a particular functional portion of the distributed game engine; and a configuration agent to receive update to the configuration of the resources to meet predicted demand for different types of resources in order to satisfy the success criteria defined for the online game during a subsequent game play session, wherein the distributed game engine is configured to provision the different types and the amount of each of the different types of resources based on the update to the configuration prior to receiving game play requests from users of the online game for the subsequent game play session.

2. The computing system of claim 1, wherein the distributed game engine includes, a plurality of management nodes configured for distributing functional portions of the distributed game engine over a plurality of processing nodes, wherein each processing node of the plurality of processing nodes providing the resource to process the specific feature of the online game corresponding to the particular functional portion of the distributed game engine;

the resource allocation agent configured to identify certain ones of the plurality of processing nodes having resources required for processing specific ones of the functional portions of the online game based on current configuration; and a process synchronization layer that interfaces with each of the plurality of processing nodes and each of the plurality of management nodes to provision the resources for executing the functional portions for the online game that produces video frames for rendering at client devices of the users.

3. The computing system of claim 2, wherein the resource allocation model identifies each type and a number of processing nodes of said each type required for processing the specific ones of the functional portions of the distributed game engine.

4. The computing system of claim 2, wherein each functional portion identifies a specific game engine task of the distributed game engine, and wherein the process synchronization layer includes a virtual bus to, manage assignment of select processing nodes of the plurality of processing nodes to process specific ones of game engine tasks for the online game;

distribute the specific ones of the game engine tasks to the select processing nodes for processing;

route processed results between the select processing nodes and remaining ones of the plurality of processing nodes and between the select processing nodes and the configuration agent; and synchronize processing of the game engine tasks distributed amongst the plurality of processing nodes, the synchronization includes managing queues of the game engine tasks in accordance to process timings of the respective ones of the game engine tasks.

5. The computing system of claim 2, wherein each of the plurality of management nodes and each of the plurality of processing nodes are assigned to distinctly separate servers for execution, wherein the servers are within a single data center or are distributed across a plurality of data centers distributed geographically.

6. The computing system of claim 5, wherein the servers are stand-alone physical servers, or physical servers that are part of one or more data centers, or virtual servers, or container servers, or any two or more combinations thereof.

7. The computing system of claim 1, wherein the online game is executed on a game cloud system.

8. The computing system of claim 7, wherein the users are accessing the online game from different geo locations, and the distributed game engine is configured to provision resources across a network of servers distributed geographically.

9. A method for provisioning resources for an online game, comprising:

constructing a resource allocation model using machine learning algorithm with game play training data collected from one or more prior game play sessions of the online game, the game play training data includes inputs received from users during the one or more prior game play sessions of the online game, game states of the online game, and success criteria;

analyzing outputs of the resource allocation model, using a resource allocation agent, to identify an output defining configuration of types of resources and an amount of each type of resource that were assigned to satisfy the success criteria defined for the online game during the one or more prior game play sessions, wherein each type of resource identified is configured to process a specific feature of the game play training data generated from game play of the online game, and wherein the specific feature corresponds with a particular functional portion of a distributed game engine; and receiving update to the configuration of the resources for meeting predicted demand for different types of resources to satisfy the success criteria defined for the online game during a subsequent game play session of the online game; and provisioning the different types and the number of each of the different types of the resources, using a distributed game engine, for meeting the predicted demand, the provisioning based on the update to the configuration of resources prior to receiving game play requests from users of the online game for the subsequent game play session, the provisioned resources satisfying the success criteria of the online game.

* * * * *